United States Patent [19]
Gibson

[11] Patent Number: 6,069,634
[45] Date of Patent: May 30, 2000

[54] SYSTEM FOR RAPIDLY DEFORMING A GRAPHICAL OBJECT

[75] Inventor: Sarah Gibson, Arlington, Mass.

[73] Assignee: Mitsubishi Electric Information Technology Center America, Inl, Cambridge, Mass.

[21] Appl. No.: 08/780,388

[22] Filed: Jan. 8, 1997

[51] Int. Cl.$^7$ ...................................................... G06F 15/00
[52] U.S. Cl. .............................................................. 345/424
[58] Field of Search ..................................... 345/427, 424, 345/420, 419, 441, 121

[56] References Cited

U.S. PATENT DOCUMENTS 5,592,599  1/1997  Lindholm ................................. 345/427

OTHER PUBLICATIONS

Demetri Terzopoulos, et al.; "Modeling Inelastic Deformation: Viscoelasticity, Plasticity, Fracture"; Aug., 1988, *Computer Graphics*, vol. 22, No. 4. pp. 269–278.

Eiji Takahashi, et al.; "Surgical Simulation of Elastic Organs"; Jul., 1996; *Medical Imaging Technology*, vol. 14, No. 4.

Hidemasa Yoshida, et al.; "A Volumetric Deformation Technique Based on Voxel Data"; ITE Technical Report, vol. 18, No. 23, pp. 23–28.

S. Kai, et al.; "Elastic Organ Model for Surgical Planning System"; Jul., 1996; *Medical Imaging Technology*, vol. 14, No. 4.

*Primary Examiner*—Phu K. Nguyen
*Attorney, Agent, or Firm*—Dirk Brinkman

[57] ABSTRACT

A voxel-based system for rapidly deforming volumetric objects performs simple deformation calculations for each element of the graphical object to be deformed such that when the object is manipulated, the object stretches or contracts through the movement of a selected element, followed by movement of neighboring elements only if a maximum or minimum preset distance is exceeded between the moved element and its neighbor. Thus elements are moved only if they need to be, which eliminates calculating movements of elements not affected by movement of the selected element. This in turn allows fast propagation of the deformation through the volume represented by the object to the deformed, with the motion constraints being similar to the motion provided by a set of linked elements in a chain.

16 Claims, 11 Drawing Sheets

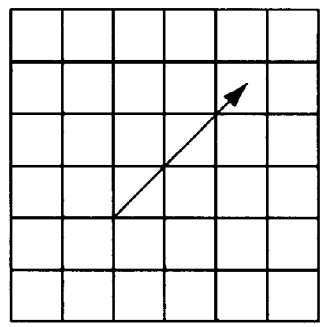
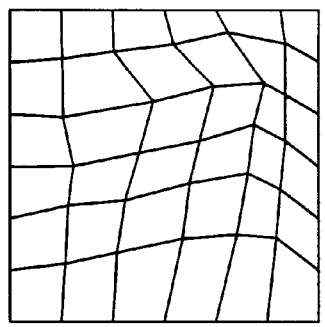
Fig. 6A        Fig. 6B
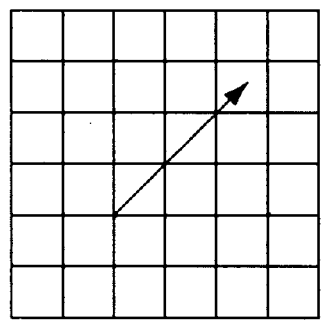
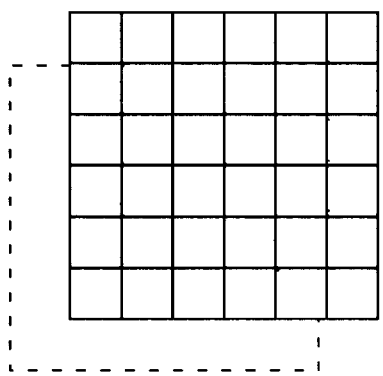
Fig. 7A        Fig. 7B
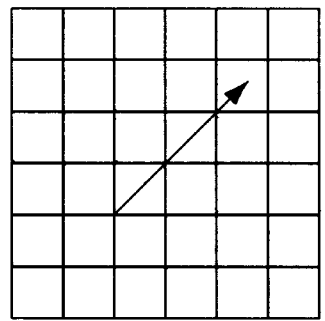
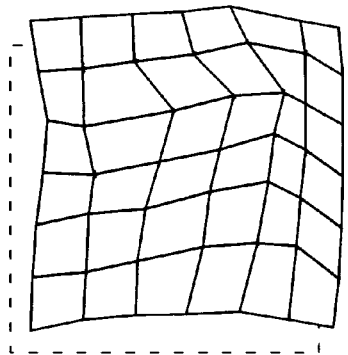
Fig. 8A        Fig. 8B

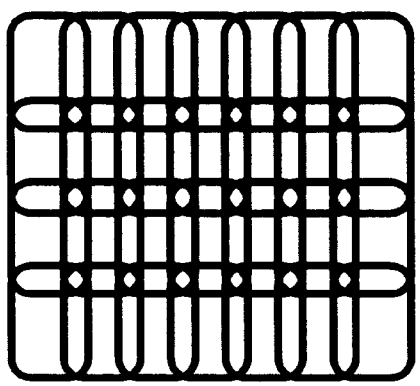
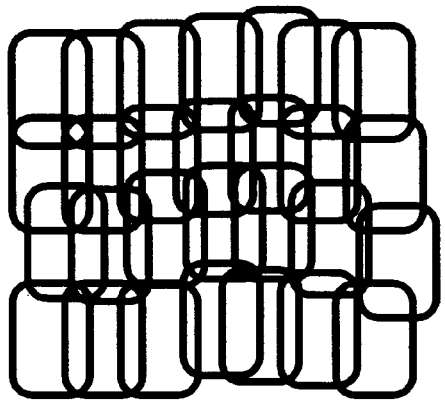
Fig. 10A　　　　Fig. 10B
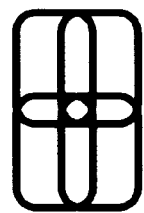
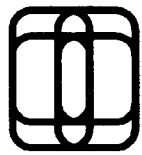
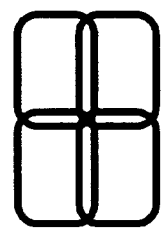
Fig. 11　　Fig. 12　　Fig. 13

SYSTEM FOR RAPIDLY DEFORMING A GRAPHICAL OBJECT

FIELD OF INVENTION

This invention relates to voxel-based systems and more particularly to a system for rapidly deforming volumetric objects.

BACKGROUND OF THE INVENTION

Surgical simulation requires interactive modeling and visualization of complex, 3D anatomical structures. For example, surgery of the abdomen involves probing and cutting through organs and tissues that have complex shapes and material properties. Because modeling the deformation and cutting of tissue requires a representation of interior structure, volumetric object representation is well suited to surgical simulation. A volumetric representation can incorporate detailed information about internal anatomical or physiological structure. This detailed information can be used to model tissue deformation more accurately than a model which represents the object surface and assumes a homogeneous interior. Because a volumetric representation uses the data produced by 3D medical scanners directly, errors that are introduced by fitting polygonal surfaces to the discrete image data can be avoided.

In a volumetric object representation, the object is stored as a discrete 3D array of sampled data elements. Each data element can consist of several bytes of information including visual properties, such as color or transparency, or material properties, such as tissue type or elasticity. The major disadvantage of volumetric representations is that objects can consist of millions of volume elements. This large data requirement poses challenges for memory storage and access, for real-time rendering and for physically realistic modeling of object interactions. There is therefore a need for a fast algorithm for modeling the deformation of volumetric objects. The algorithm should be able to model a range of materials including rigid, deformable, elastic, and plastic substances. In addition, the algorithm should model anisotropic materials, such as muscle, which have different material properties along different axes.

By way of background, there are three relevant basic technologies. These are: Volume Graphics; physics-based graphics; and soft tissue modeling using Finite Element Modeling (FEM) and other methods.

As described by A. Kaufman et al. in "Volume Graphics", IEEE, Computer, Vol. 23, 7, pp. 51–64, 1993; "Volume Visualization", CRC Handbook of Computer Science and Engineering, 1996; "Efficient algorithms for 3D scan-conversion of parametric curves, surfaces, and volumes", Computer Graphics, Vol. 21, 4, ppo. 171–179, 1987; and "Volume sampled elementization of geometric primitives", Proceedings Visualization '93, San Jose, Calif., pp. 78–84, October, 1993, there are various strategies to deal with the synthesis, modeling, manipulation, and rendering of volumetric objects. Prior work in Volume Graphics includes the development of techniques to replace the traditional graphics pipeline of polygon graphics with new methods for volumetric data. For example, shading, antialiasing, and rendering algorithms, described by Kaufman in *Volume Visualization*, IEEE Computer Society Press, Los Alamitos, Calif., 1991, are replaced by their volumetric counterparts. This is also discussed by L. Sobierajski and A. Kaufman in "Volumetric ray tracing", proc. Volume Visualization Symposium, Washington, D.C., pp. 11–18, 1994; and in the aforementioned October 1993 Proceedings Visualization reference.

New algorithms and hardware implementations for volume rendering of regular volumes are described by H. Pfister in his Ph.D. thesis, SUNY at Stony Brook, August 1996; P. Lacroutte and M. Levoy, "Fast volume rendering using a shearwarp factorization of the viewing transform", proc. SIGGRAPH, Computer Graphics, pp. 451–457, 1994; and G. Knittle in "A scalable architecture for volume rendering", Computer and Graphics, Vol. 19, No. 5, pp. 653–665, 1995. Recently, attention in Volume Graphics has been given to object manipulation, including haptic interaction with volumetric objects and physically realistic modeling of object interactions as discussed by S. Gibson, "Beyond Volume Rendering, Visualization, Haptic Exploration, and Physical Modeling of Voxel-Based Objects" in Visualization in Scientific Computing, eds. R. Scatini, J. Van Wijk, and P. Zanarini Springer-Verlas, pp. 10–24, 1995 and by R. Avila, , L. Sobieraajski in "A Haptic Interaction Method for Volume Visualization", Proc. Visualization '96, pp. 197–204, 1996.

There is also a growing interest in physically realistic modeling of object interaction in the graphics community. This includes both detecting object collisions and modeling the energy and momentum transfer between colliding objects, problems that have been addressed for real-time interactions of rigid object representations. See B. Mirtich, J. Canny, "Impulse-based simulation of rigid bodies", proc. 1995 Workshop on Interactive 3D Graphics, pp. 181–188, April, 1995; D. Baraff, "Analytical methods for dynamic simulation of non-penetrating rigid bodies", (proc. SIGGRAPH), Computer Graphics, Vol. 24, pp. 19–28, 1989 and the above Gibson article.

As to soft-tissue modeling, finite Element Modeling (FEM) can be used to model complex materials. Careful selection of element nodes and accurate knowledge of the material properties at each node point enables accurate simulation of complex mechanical behaviors. FEM has been applied to modeling the skin and muscle layers of the face as described by D. Terzopoulos, J. Platt, A. Barr, K. Fleischer in "Elastically deformable models", Computer Graphics, Vol 21, 4, pp. 205–214, July, 1987; D. Terzopoulos, K. Waters, "Physically-based facial modeling, analysis, and animation", J. Visualization and Computer Animation, Vol. 1, pp. 73–80, 1990; and Y. Lee, D. Terzopoulos and K. Waters, "Realistic modeling for facial animation", Computer Graphics (proc. SIGGRAPH), pp. 55–62, 1995. Skeletal muscle modeling is described in D. Chen, "Pump it up; computer animation of a biomechanically based model of muscle using the finite element method", PhD thesis, Media Arts and Sciences, MIT, 1991. Moreover, modeling of the liver is described by Cotin et al. Biomed Vis '96 and modeling of the eye is described by I. Hunter, T. Doukoglou, S. Lafontaine, and P. Charette in "A teleoperated microsurgical robot and associated virtual environment for eye surgery", Presence, Vol. 2, pp. 265–280, 1993.

However, because of computational requirements, FEM cannot be used in interactive applications unless the number of node points is small. Useful FEM computation reduction techniques such as multigrid methods and model analysis are described in A. Pentland, J. Williams, "Good Vibrations: modal dynamics for graphics and animation", Computer Graphics, Vol. 23, 3, pp. 215–222, July, 1989. Moreover, related techniques are described by I. Essa, S. Scarloff, A. Pentland, "Physically-based modeling for graphics and vision", in Directions in Geometric Computing, ed. Ralph Martin, "Information Geometers", U.K., 1993; and D. Metaxas, D. Terzopoulos, "Dynamic deformation of solid primitives with constraints", Computer Graphics (proc. SIGGRAPH), Vol. 26, 2, pp. 309–312, 1992. However, the computational complexity of FEM remains a bottleneck for interactive soft tissue modeling.

Other techniques that have been used to model soft tissue include: free-form deformation as described by T. Sedeberg and S. Parry in "Free-form Deformation of Solid Geometric Models", Computer Graphics (proc. SIGGRAPH) Vol. 22, 4, August 1986, pp. 151–160 and W. Hsu, J. Hughes, H. Kaufman, "Direct Manipulation of Free-form Deformations", Computer Graphics (proc. SIGGRAPH), Vol. 26, 2, pp. 177–184, 1992. Modeling of active surfaces are described by S. Cover, N. Ezquerra, J. O'Brien, R. Rowe, T. Gadacz, E. Palm in "Interactively deformable models for surgery simulation", IEEE Computer Graphics and Applications, Vol. 13, 6, pp. 68–75, 1993; whereas modeling for active cubes is described by M. Bro-Nielsen in "Modeling elasticity in solids using active cubes—application to simulated operations", in Computer Vision, Virtual Reality and Robotics in Medicine proc. CVRMed '95 ed. Nicholas Ayache, pp. 535–541.

Using a "zone of influence" to predefine the effect that displacement of a given node point will have on neighboring nodes is described by K. Waters in "A Muscle model for animating three-dimensional facial expression", Computer Graphics, Vol. 21, 4, pp. 17–24, July, 1987. Moreover, using implicit surfaces to model soft substances is described by M. Desbrun, M. P. Gascuel in "Animating soft substances with implicit surfaces", Computer Graphics (proc. SIGGRAPH), pp. 287–290, 1995. These techniques are useful because of their speed but their accuracy is limited for complex tissues.

By way of summary in object deformation, the large number of elements in a volumetric object poses a significant challenge for interactive applications that model physically realistic object deformation. One approach is to perform FEM calculations on a lower resolution grid. However, this does not take advantage of the high resolution data produced by medical scanners. Thus, presently there is no computationally efficient way to deform volumetric objects.

SUMMARY OF THE INVENTION

In order to solve the problem of efficient deformation of objects, a voxel-based system for rapidly deforming volumetric objects performs simple deformation calculations for each element of the graphical object to be deformed such that when the object is manipulated, the object stretches or contracts through the movement of a selected element, followed by movement of neighboring elements only if a maximum or minimum preset distance is exceeded between the moved element and its neighbor. Thus elements are moved only if they need to be, which eliminates calculating movements of elements not affected by movement of the selected element. This in turn allows fast propagation of the deformation through the volume represented by the object to be deformed, with the motion constraints being similar to the motion provided by a set of linked elements in a chain.

Deformation of a graphical object is provided by a specialized algorithm called the 3D ChainMail algorithm that uses the original data resolution but performs relatively simple calculations for each element of the graphical object to be deformed. As mentioned above, when the object is manipulated, the object stretches or contracts to satisfy maximum and minimum allowable distances between neighboring elements. The movement of each element depends only on the positions of its nearest neighbors, allowing fast propagation of the deformation through the volume of the object to be deformed. Because the motion constraints are similar to those of a set of linked elements in a chain, this algorithm has been dubbed 3D ChainMail.

More particularly, the 3D ChainMail algorithm is an algorithm for deforming objects that consist of large arrays of elements that have been linked. Like a linked chain, the movement of one element causes its neighbors to move whenever maximum or minimum distances between neighbors are reached.

By way of example, when one element is selected and moved to the right, if the minimum distance to right neighbors or the maximum distance from left neighbors is reached, the neighboring links move along with the selected link. Thus, when one element of the object is pulled or pushed, neighboring links absorb the movement by taking up slack in the structure. If a link between two elements is stretched or compressed to its limit, displacements in a relatively slack system result in only local deformations, while displacements in an object that is already compressed or stretched to its limit causes the whole object to move. In the 3D ChainMail algorithm, volume elements of an object to be deformed are linked to their nearest neighbors, in 3D, six neighbors, in 2D, four neighbors. Much like the links in a chain, neighbors only respond to a given element's movement if constraints on the distances between elements are violated. Changing the constraints on link lengths allows one to model both rigid and deformable objects.

In one embodiment, an interactive system for rapid deforming of volume objects, consists of five major subsystems: 1) an interactive control loop that monitors selection and control of the volumetric object; 2) an algorithm which stretches or contracts the objects when a selected element is moved; 3) an elastic relaxation algorithm which adjusts relative element distances to minimize the system energy; 4) collision detection to check for collisions and prevent interpenetration of objects; and 5) rendering of the deformed object for visual feedback.

In this implementation, the object data structure consists of the object size, its type or classification, a pointer to the object elements, and the deformation and equilibrium limits which are assumed to be constant throughout the object in this implementation. Volume element data structures consist of a element color (r,g,b), a position vector (x,y,z) and pointers to the six (6) nearest neighbors: top, bottom, front, back, left, and right. An additional data structure keeps track of previous positions of moved elements for fast backtracking after a collision is detected or after reaching an object configuration that is not permitted.

The system consists of two phases: an initialization phase to read in and initialize data structures; and an X-Event control loop that continuously monitors and responds to user inputs. Button clocks and releases are used to select and deselect elements in the object. If an element is selected, mouse movements control displacements of the selected element. If a desired displacement results in an object state that is not permissible due to collisions with other objects or the boundaries of the virtual space, then the largest possible step towards the desired position is taken. The user interface also monitors changes in the deformation and elasticity parameters, rendering engines, and termination of the session.

The result of using the link system is several orders of magnitude increase in the speed for modeling object deformation. This is accomplished because of three main features of the 3D ChainMail algorithm.

First, for each movement of a selected element, the deformation propagates outwards from the selected element to neighboring elements only until all neighboring constraints are satisfied. If the constraints of outlying neighbors are not violated, propagation halts. Hence, one never looks at more elements that one has to.

Second, using the 3D ChainMail algorithm, each element must be considered at most once to calculate the new system configuration for each movement of the selected element. This is due to the ordering of elements that are considered during the deformation.

Finally, for each movement of a selected element, the displacement of each neighbor can be calculated from the newly adjusted position of a single neighbor.

BRIEF DESCRIPTION OF THE DRAWINGS

These and other features of the subject invention will be better understood taken in conjunction with the Detailed Description in conjunction with the Figures of which;

FIGS. 6A and 6B illustrate the effect of moving an element of a loose volumetric object, indicating that the object being deformed is not moved, but that only internal structure is moved;

FIGS. 7A and 7B are diagrams illustrating the effect of moving a volumetric element in a rigid volumetric object, indicating movement of the entire object without internal deformation;

FIGS. 8A and 8B are diagrams illustrating the effect of moving an element in a semi-rigid volumetric object indicating both internal deformation and overall movement of the volumetric object;

FIGS. 10A and 10B are schematic illustrations of the effect of movement of an element in a 2D link arrangement, illustrating link movements and corresponding deformation;

FIG. 11 is a schematic illustration of a set of four links in a rest position;

FIG. 12 is a schematic illustration of a set of four links maximally compressed;

FIG. 13 is a schematic illustration of a set of four links maximally expanded;

DETAILED DESCRIPTION

Figure 1A:
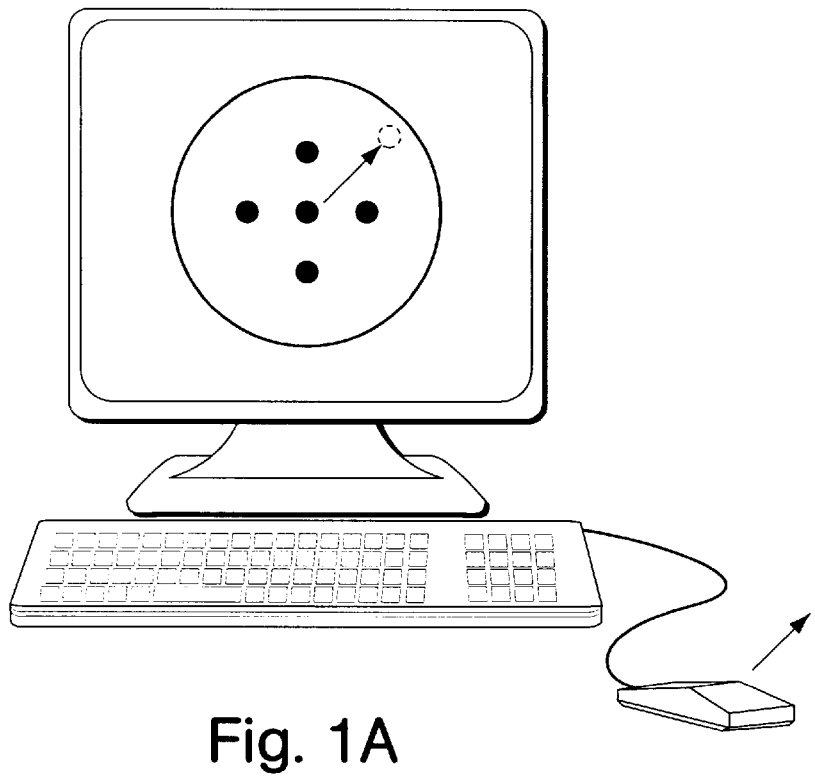
FIG. 1A is a diagrammatic representation of a system for rapidly deforming volumetric objects by selecting a volumetric element and moving it in accordance with mouse movement to deform the corresponding volumetric object.
Figure 1B:
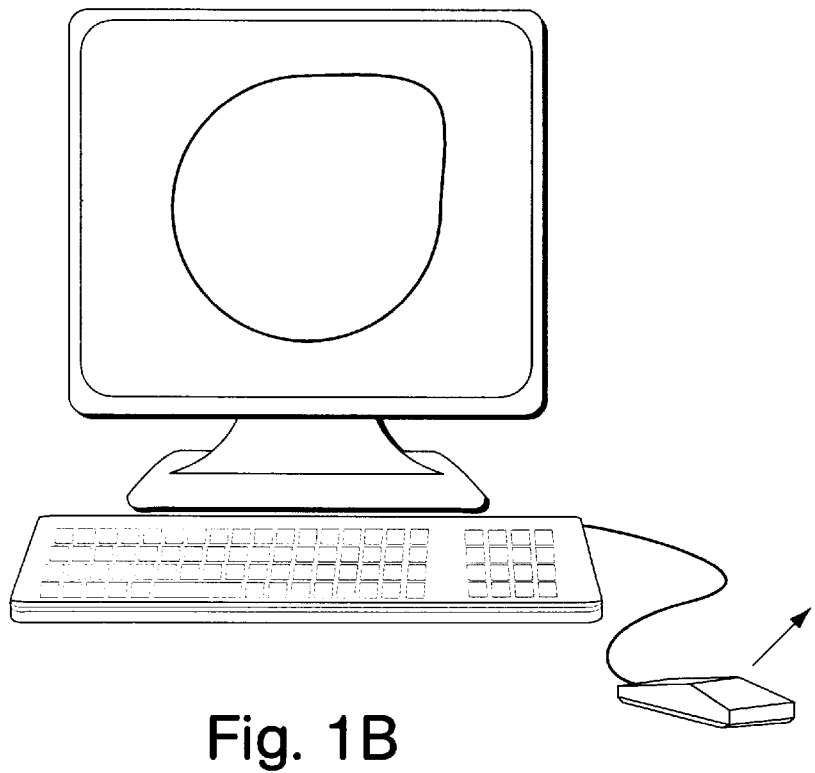
FIG. 1B is a diagrammatic representation of the system of FIG. 1A showing the volumetric object deformed by movement of the selected volumetric element.

Referring now to FIG. 1A, a computer terminal 10 is provided with a screen 12 on which is depicted a volumetric object 14 made up of volumetric elements of which elements 16, 18, 20, 22, and 24 are examples. Note that element 16 is the element to be moved, with elements 18–24 being respectively the immediate left neighbor, the immediate right neighbor, the immediate top neighbor and its immediate bottom neighbor. Whenever it is decided to deform object 14 by the movement of an internal element, mouse 26 selects element 16 and moves generally in the desired direction 28 such that element 16 is moved in the direction 28' to a position indicated by dotted circle 30. The resulting deformation of object 14 is shown by object 14' in FIG. 1B.

Figure 2:
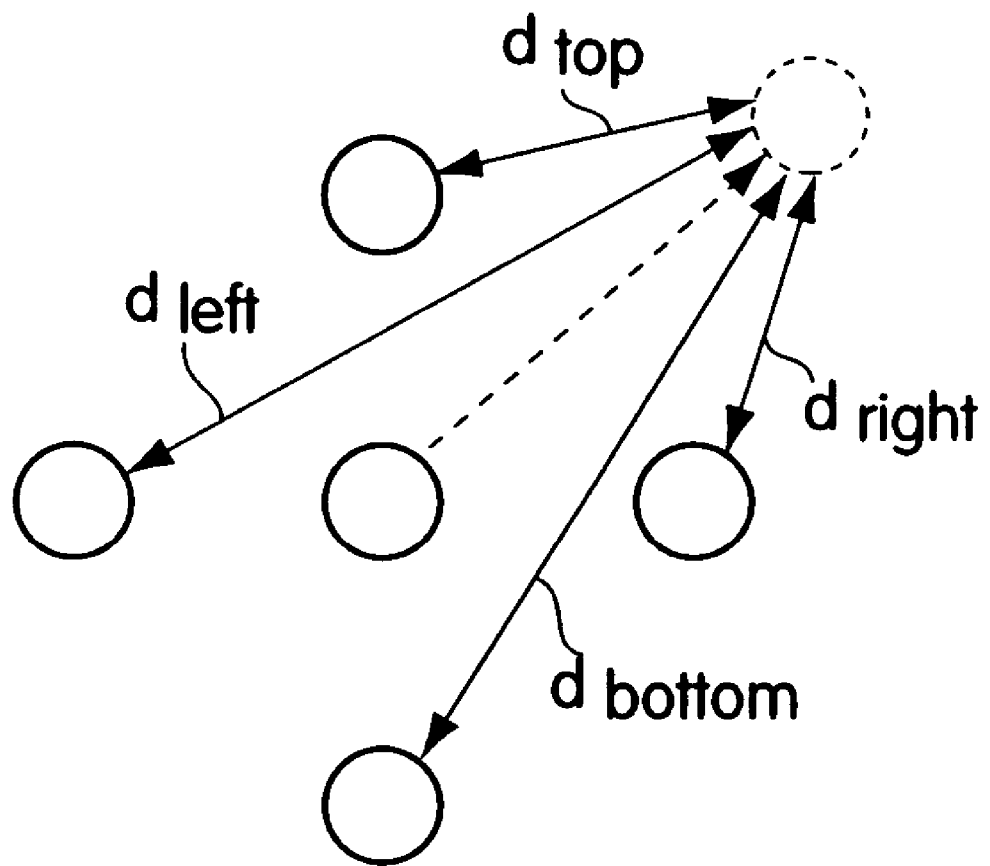
FIG. 2 is a schematic representation of the movement of the volumetric element of FIG. 1 in which the distances to four neighboring elements are depicted.

How this is accomplished is illustrated in FIG. 2, in which neighboring elements are only moved if the distance between the moved element, here illustrated at 30, and its nearest neighbors, namely elements 18, 20, 22 and 24, exceeds a predetermined maximum distance. Thus, elements 18–24 are only moved if the corresponding distance $d_{left}$, $d_{right}$, $d_{top}$, $d_{bottom}$, from the element 30 exceeds some maximum limit or is less than some minimum limit.

Figure 3:
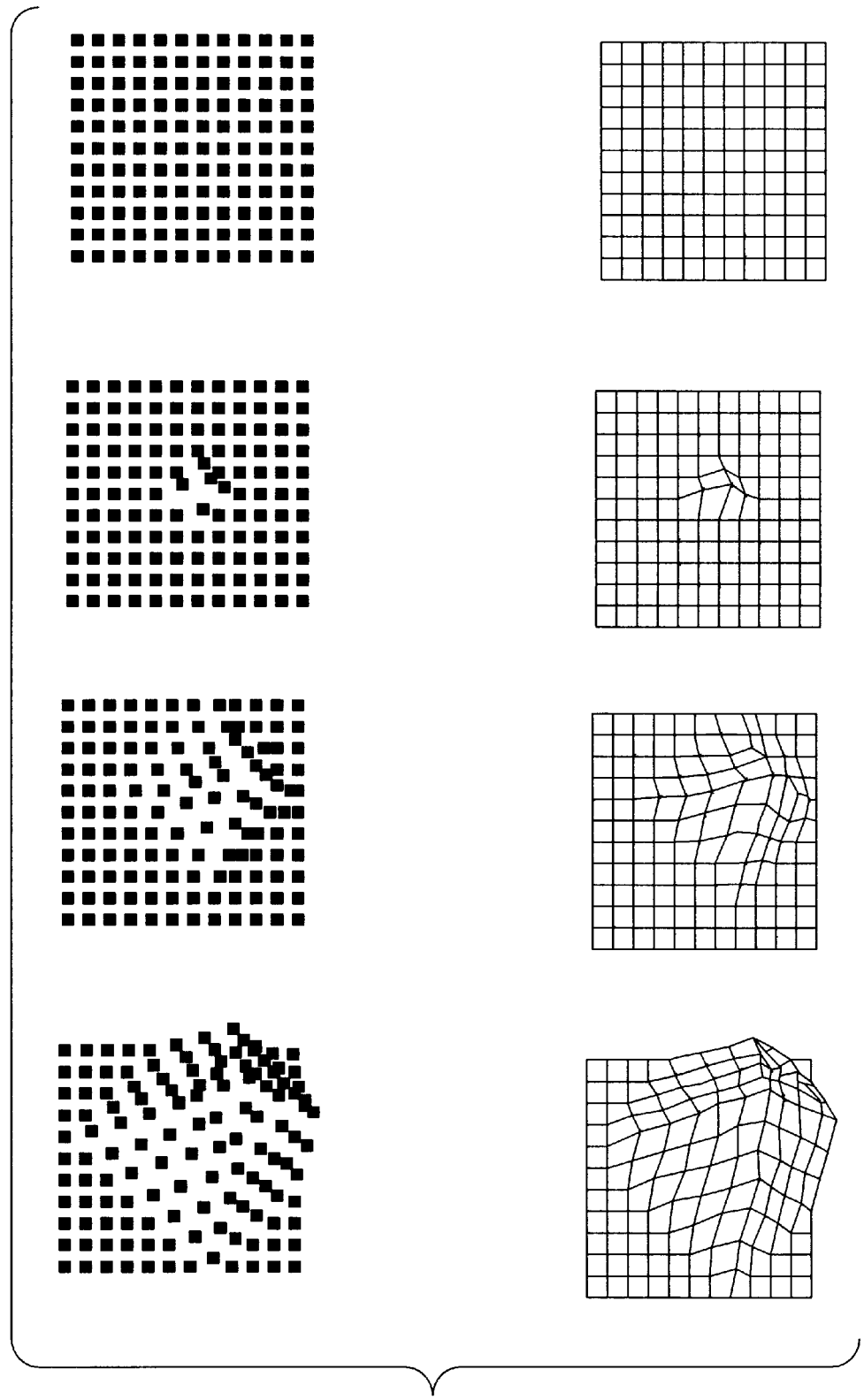
FIG. 3 is a series of pictorial representations of the deformation of a 2D volumetric object in terms of element displacement and corresponding link deformation for the movement of a selected element in the center of the volumetric object.

The result of such a movement is shown diagrammatically in FIG. 3 where element 16, here shown either as a square dot or as the intersection of lines of the corresponding grid, is moved upwardly and to the right, with the movement of the moved element causing neighboring elements to move as illustrated. Note that the movement and subsequent distortion is done on a neighbor by neighbor basis, based on exceeding minimum or maximum distance criteria.

As can be clearly seen, the movement of neighboring elements causes an overall deformation of the object such that, as can be seen from the bottom most illustration, the entire object is deformed through the movement of a selected internal element.

Figure 4:
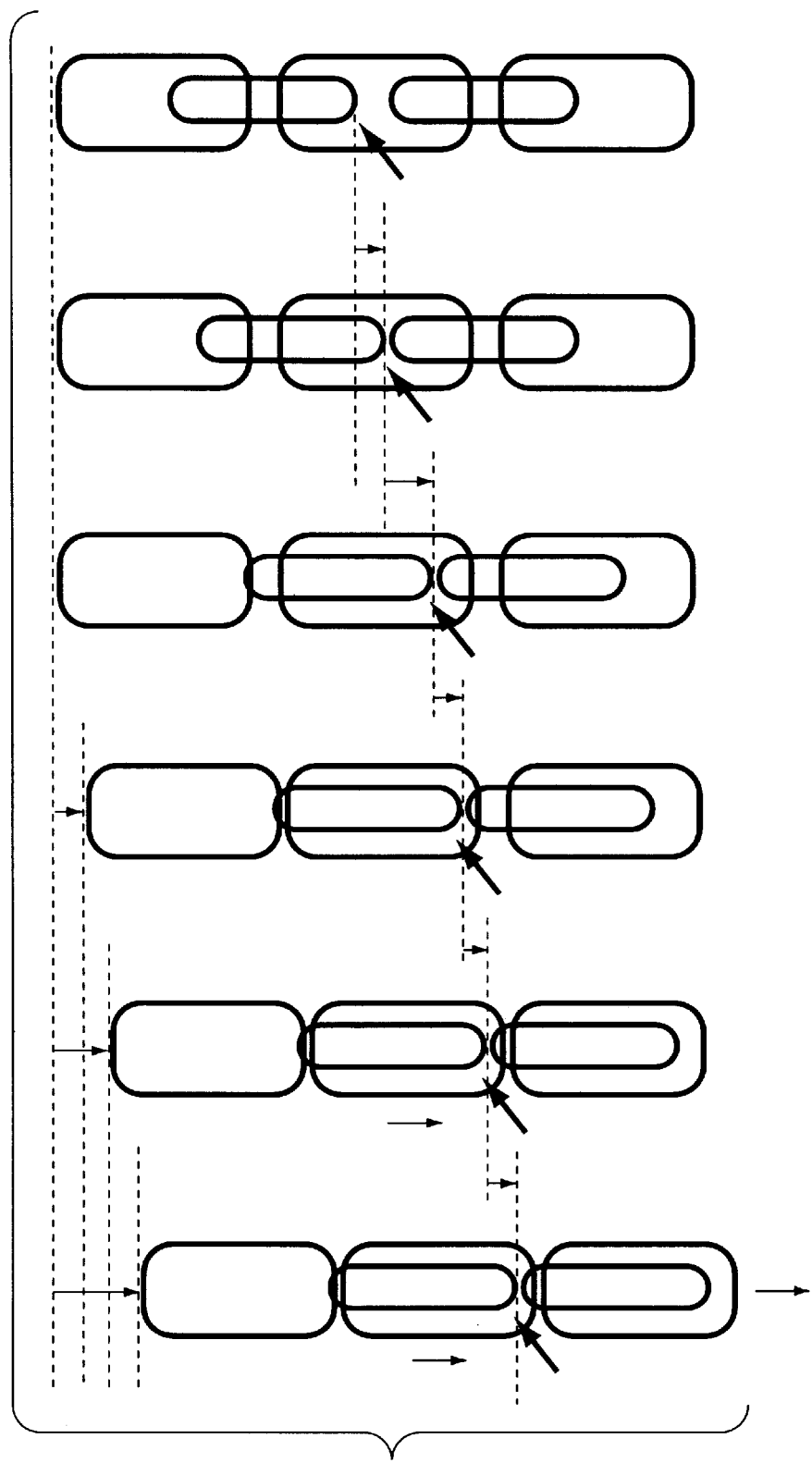
FIG. 4 is a diagrammatic representation of the chain link analogy to moving a volumetric element to the right, indicating no effect on neighboring links until a predetermined displacement of the element is exceeded, at which time neighboring links are moved.

Referring now to FIG. 4, the analogy to a linked chain can be easily seen. Assuming two links 40 and 42 having centers 44 and 46 spaced apart by a distance d, then if one were to push link 40 to the right, center 44 would move toward center 46. This pushing action on link 40 is indicated by heavy arrow 48 which makes link 40 a pushing link. For a given minimum threshold, $T_{min}$, link 42 moves to the right as indicated by arrow 50, making link 50 the pushed link. Thus, when the minimum threshold is met by d being less than $T_{min}$, then the pushed link moves.

For a pulling operation, link 46 is pulled in the direction of heavy arrow 52. This, at some point, causes d to be greater than a maximum threshold $T_{max}$. When this threshold is exceeded, link 40 moves in the direction of arrow 54.

Thus, movement of one link only affects a neighboring link, e.g., only if $T_{min}$ or $T_{max}$ has been exceeded. The movement of elements is equivalent to the movement of links, both in the description of the movement desired and the deformation speed and characteristics, such that by defining T, one can characterize the deformation of an object as to stiffness or rigidity of the object. As a result, soft and hard objects can be given different deformation characteristics.

Figures 5A, 5B, 5C, 5D:
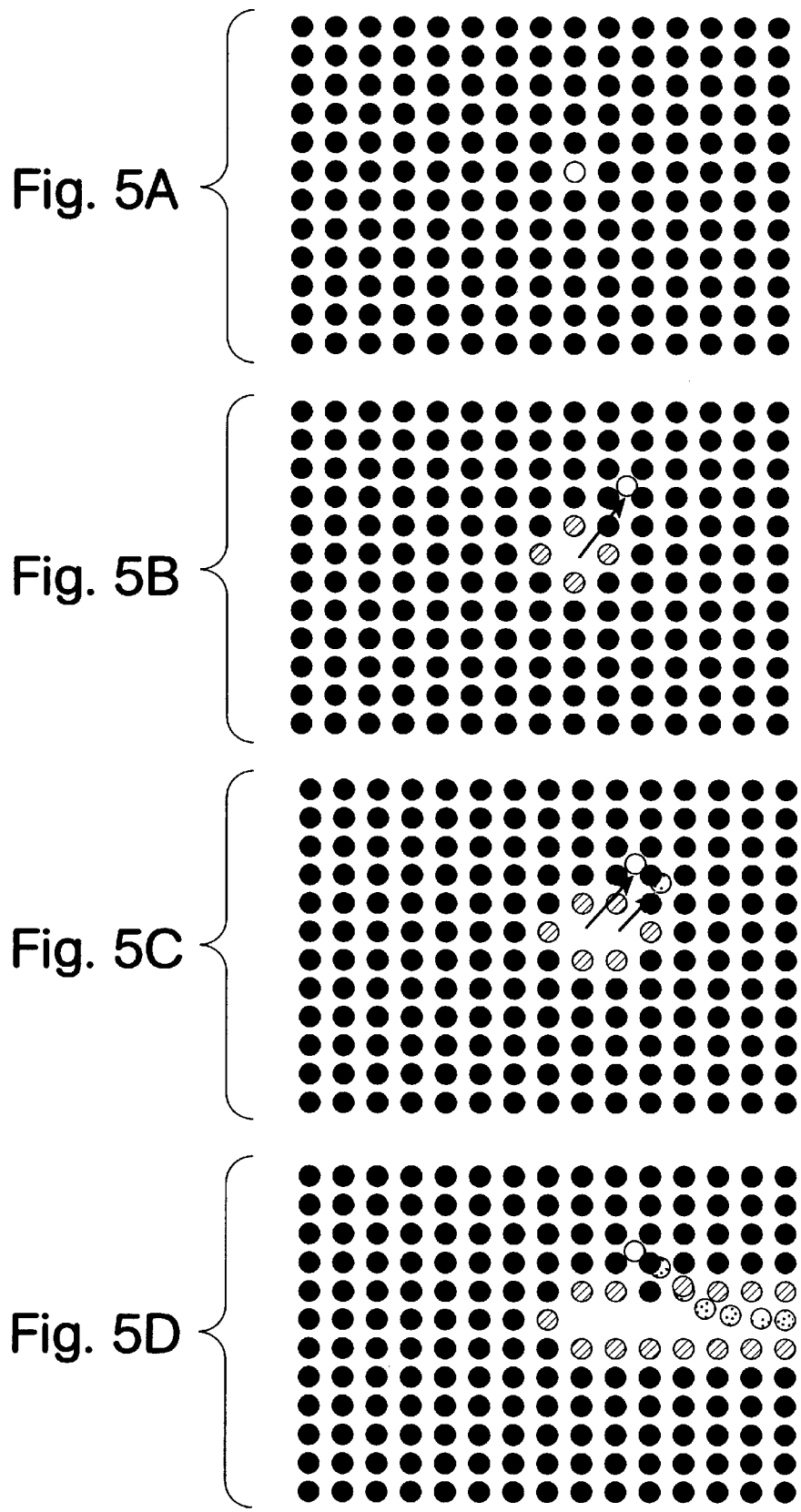
FIGS. 5A–5D are diagrammatic illustrations of the order in which adjacent elements respond to the movement of one element, such that when an element is moved to satisfy constraints, its adjacent elements are added to the list of elements to be considered for movement.

Referring now to FIGS. 5A–5D, how a moved element, in this case element 70, affects its neighbors is graphically illustrated. As can be seen in FIG. 5A, element 70 is selected. In 5B, element 70 is moved to the position 70' which affects its immediate neighbors 72, 74, 76, and 78.

However, the movement of these neighbors, such as 76, in turn has its own neighbors 82, 84, and 86. This in turn causes movement of further elements, such as 86, that results in considering other elements as illustrated.

Referring to FIGS. 6A and 6B, it will be appreciated that various constraints can be put on the relative rigidity or deformability of the object to be deformed. For instance, as shown in FIGS. 6A and 6B, for a relatively soft material, movement of an element in the direction of arrow 90 causes large local deformations in object 92, but very little deformation of elements far from the selected point.

Referring to FIGS. 7A and 7B, for a totally rigid object 96, movement in the direction of arrow 90 causes no local deformation. Instead all of the elements are caused to move such that the object moves to the position 96' from its original position here illustrated by dotted box 90'.

As an intermediate example, assuming a semi-rigid object 98 moves in the direction of arrow 90, then as can be seen in FIG. 8B, object 98' is slightly distorted in the local region 100, but is also subject to some global deformation and movement as illustrated by dotted box 90'.

What can be seen, is that the deformation of an object depends not only on the movement of an internal element, but also on the characterization of the object in terms of its rigidity or deformability. This rigidity or deformability can be uniquely determined by the minimum or maximum constraints on distance.

As can be seen, the subject algorithm can model objects with a range of material properties. By adjusting the link constraints, the object can be modeled as rigid or deformable and the amount of deformation can be changed. The object material can be anisotropic so that the object can deform more along one axis than the other. Note that 3D ChainMail algorithms can deform objects of arbitrary shape, including non-convex objects.

Object Deformation: 3D ChainMail Algorithm

Figure 9A:
FIGS. 9A, 9B and 9C are schematic illustrations in one dimension of the link structure of the 2D chain mail algorithm showing movement of the chain only when a predetermined distance between a moved element and its nearest left neighboring element is exceeded.
Figure 9B:
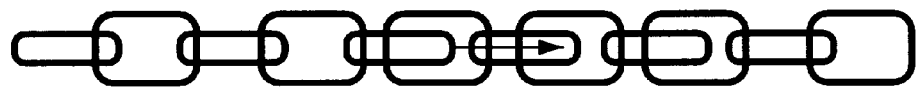
Figure 9C:

More particularly, the large number of elements in a volumetric object poses a significant challenge for interactive applications that model physically realistic object deformation. One approach is to perform FEM calculations on a lower resolution grid. However, this does not take advantage of the high resolution data produced by medical scanners. In the subject invention, an object deformation system uses the 3D ChainMail algorithm that uses the original data resolution but performs relatively simple deformation calculations for each element. When the volume is manipulated, the object stretches or contracts to satisfy maximum and minimum allowable distances between neighboring elements. The movement of each element depends only on the positions of its nearest neighbors, allowing fast propagation of the deformation through the volume. Because the motion constraints are similar to those of a set of linked elements in a chain, this algorithm has been dubbed 3D ChainMail. Links and link movement is shown in FIGS. 9A–9C for a 1D chain link system.

FIGS. 10A and 10B respectively show an example of the deformation of a 2D linked chain undeformed and then deformed, whereas FIGS. 11, 12 and 13 show a system at rest, a maximally compressed 2D chain link system and a maximally stretched 2D chain link system to illustrate the range and configuration that a chain link can attain.

In the 3D ChainMail algorithm, volume elements are linked to their six nearest neighbors. When one node of the structure is pulled or pushed, neighboring links absorb the movement by taking up slack in the structure. If a link between two nodes is stretched or compressed to its limit, displacements are transferred to its neighboring links. In this way, small displacements of a selected point in a relatively slack system result in only local deformations of the system, while displacements in a system that is already stretched or compressed to its limit causes the whole system to move. Much like the links in a chain, neighbors only respond to a given element's movement if constraints on the distances between elements are violated.

Two types of lists are maintained in this algorithm: a list consisting of pointers to elements that have been moved and their previous positions; and four lists of candidates for movement that are classified according to whether they are a top, left, bottom, or right neighbor of their sponsoring element. Each candidate element is processed in turn, starting from the selected element and then proceeding in order through the right, left, top, and bottom lists of candidate points. To process an element, the deformation constraints are checked against its sponsoring element. If the deformation limits are exceeded, the element is moved to a minimum distance until the constraints are satisfied. When an element is moved, either under direct control of the user or indirectly in response to a neighbor's movement, the element becomes a sponsor to its unmoved neighbors and these neighbors are appended to their respective movement candidate lists.

Figure 14:
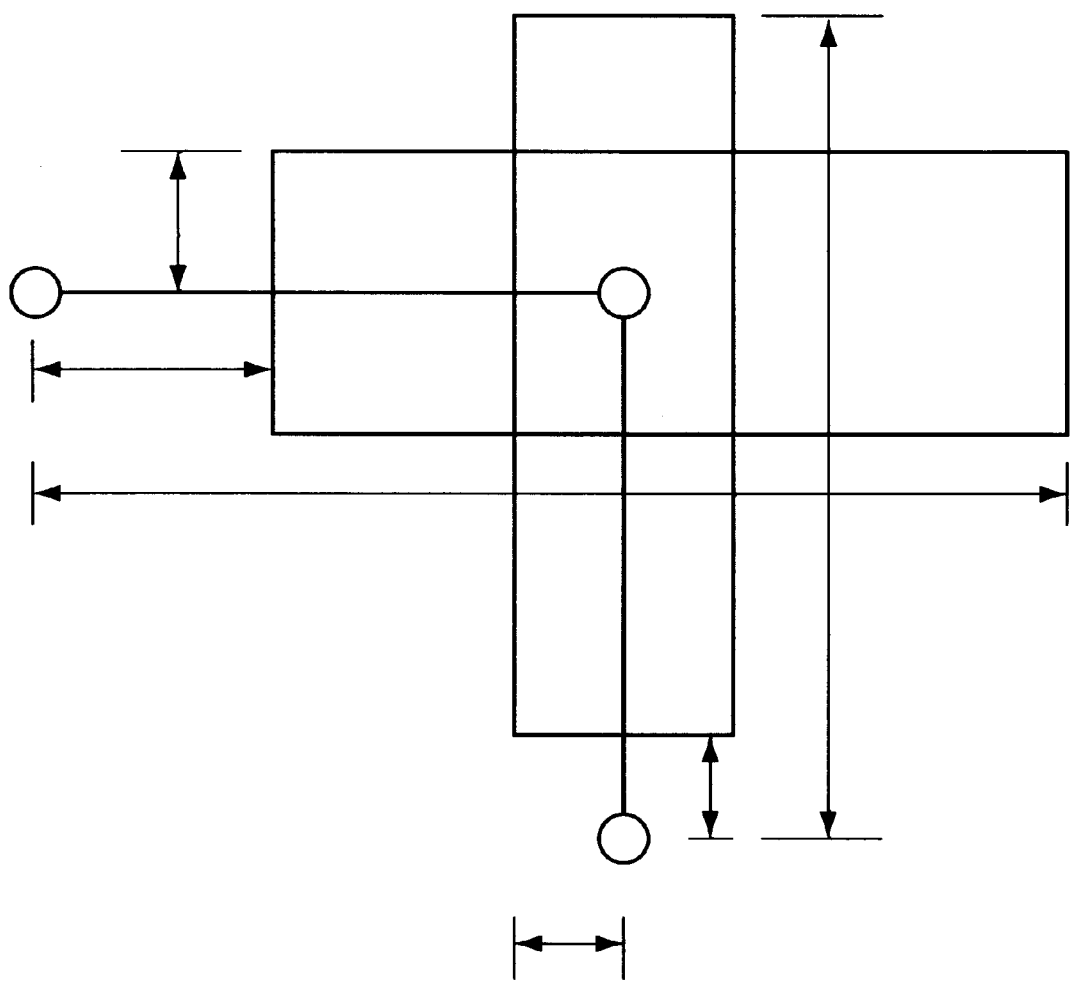
FIG. 14 is a schematic illustration of the movement limits of voxel elements relative to its left and bottom neighbors.

The deformation limits are defined as follows: each element must lie within a horizontal range of minDx and maxDx from its left and right neighbors and within a vertical range of minDy and maxDy from its top and bottom neighbors. These limits control stretching and contracting of the material. In addition, each element must lie within +/− maxHorixDy, from its horizontal, left and right, neighbors and within +/− maxVertDx, from its vertical, top and bottom, neighbors. These limits control the maximum amount of shear that is possible in the material. The definition of these limits are illustrated in FIG. 14.

The basic 3D ChainMail algorithm is as follows:

1) When the user-selected element is moved, the element and its old positions are added to the list of moved elements, its x, y positions are updated, and its four nearest neighbors (top, left, bottom right) are added to lists of candidates for movements.

2) The lists of candidate elements are processed in turn until all of the candidate lists are exhausted or the system is not permissible (in which case those elements that were moved are returned to their previous positions and a smaller step towards the desired position is attempted). The candidate lists are processed in the following order: right, left, top, bottom.

3) The right candidate list is processed in the following manner: beginning with the first element in the list, the stretch and shear constraints are checked between the list element and its sponsoring element (always its left neighbor).

If the constraints are violated, the element is moved a minimum distance until the constraints are satisfied. The new position is calculated as follows:

if $(x-x_{left})$ is less than minDx, $x=x_{left}+\text{minDx}$;
else if $(x-x_{left})$ is greater than maxDx, $x=x_{left}+\text{maxDx}$;
if $(y-y_{left})$ is less than $-\text{maxHorizDy}$, $dy=y_{left}-\text{maxHorixDy}$;
else if $(y-y_{left})$ is greater than maxHorixDy, $dy=y_{left}+\text{max-HorixDy}$:

If the element is moved, its top, right and bottom neighbors are added to their respective candidate lists. (Since the element was sponsored by its left neighbor, there is no need to add the left neighbor to the candidate list.) Each right candidate is processed in turn until no right candidates remain.

4) The left candidate list is processed in a similar way except that left elements are sponsored by their right neighbors and movement of a left element causes its bottom, left, and top neighbors to be added to the candidate lists.

5) The top and bottom list is also processed in a similar manner except that the top and bottom elements are sponsored by their bottom and top elements respectively and movement of a top (or bottom) element causes only a top (or bottom) element to be added to the correct candidate list.

The algorithm must be modified slightly for non-convex objects. In non-convex objects, if the right or left neighbor of a moved top (or bottom) element does not have a bottom (top) element, it should be added to the appropriate candidate list. Note that this may require that candidate lists be visited more than once to exhaust all the elements of all candidate lists.

In summary, in the 3D ChainMail algorithm, each element is processed in turn, starting from the selected element and then proceeding in an ordered sequence through right, left, top, and bottom neighboring elements. When an element is processed, the deformation constraints with its sponsoring element are checked. If these constraints are not violated, the element is not moved. However, if the deformation limits are violated, the element is moved a minimum distance until the constraints as satisfied.

The algorithm is especially fast for three reasons: 1) each element in the volume is considered at most once for each deformation, 2) each element is compared to only one neighbor (its sponsoring neighbor) to determine if and how it must be moved, and 3) the deformation is propagated outwards from the selected point and the propagation is terminated as soon as possible. Of these, 1) and 3) result from the way elements are added to the candidate lists. It can be shown that the second point, 2) results when the object has constant deformation limits throughout its volume.

More particularly, each element need be compared to only one neighbor when the object has constant deformation limits throughout its volume.

In the 3D ChainMail algorithm, each element can be compared to a single neighbor when the object has constant deformation limits throughout its volume.

The starting position of each element in the candidate lists already satisfies the constraints of neighbors that have not moved. Hence, the new position of a movement candidate depends only on neighbors that have been moved. (If a candidate is moved, then its unmoved neighbors are later considered for movement.)

For elements in the left (or right) candidate lists, only the sponsoring right (left) neighbor is moved prior to movement consideration. Hence, for left and right candidates, only one neighbor must be considered.

For top (or bottom) neighbors, it is possible that both the sponsoring bottom (or top) neighbor and its left (or right) neighbor were moved prior to consideration. However, it is shown here that when an element from the top candidate list satisfies deformation constraints relative to its sponsoring bottom neighbor, then it automatically satisfies the constraints of its left neighbor as long as the left neighbor was previously placed to satisfy its own bottom neighbor.

If the top and right neighbors of A satisfy the deformation constraints with respect to A, then constraints of its left neighbor was previously placed to satisfy its own bottom neighbor.

If the top and right neighbors of A satisfy the deformation constraints with respect to A (see FIG. 4), then $$A_R(x, y) \in ([x_0 + \text{minDx}, x_0 + \text{maxDx}],$$
$$[y_0 - \text{max}HorizDy, y_0 + \text{max}HorizDy])$$
$$= ([x_{\min_{AR}}, x_{\max_{AR}}], [y_{\min_{AR}}, y_{\max_{AR}}])$$

and $$A_T(x, y) \in ([x_0 - \text{max}VertDx, x0 + \text{max}VertDx],$$
$$[y_0 + \text{minDy}, y_0 + \text{max}Dy])$$
$$= ([x_{\min_{AT}}, x_{\max_{AT}}], [y_{\min_{AT}}, y_{\max_{AT}}]).$$

The top neighbor of $A_R$, $A_{R/T}$, must satisfy the deformation constraints with respect to $A_R$. Hence, $$A_{R/T}(x, y) \in ([x_{\min_{AR}-\text{max}VertDx}, x_{\max_{AR}+\text{max}VertDx}],$$
$$[y_{\min_{AR}+\text{minDy}}, y_{\max_{AR}+\text{max}Dy}])$$
$$= ([x_0 + \text{minDx} - \text{max}VertDx, x_0 + \text{maxDx} + \text{max}VertDx],$$
$$[y_0 - \text{max}HorizDy + \text{minDy}, y_0 + \text{max}HorizDy + \text{max}Dy])$$
$$= ([x_{\min_{AT}+\text{minDx}}, x_{\max_{AT}+\text{maxDx}}],$$
$$[y_{\min_{AT}-\text{max}HorizDy}, A_{top}(y)_{\max} + \text{max}HorizDy]).$$

which also satisfies the deformation constraints with respect to the left neighbor, $A_T$, or $A_{R/T}$. Hence, when considering $A_{R/T}$, an element of a top candidate list, only one neighbor must be considered to satisfy both sets of constraints. A similar argument can be made for bottom candidate lists.

Elastic Relaxation

Even when a deformation is allowable, the resultant object shape may not be a minimum energy configuration. The system energy depends on the spacing between elements and the elastic properties of the object. A fully elastic object can be deformed, but it tries to return to its original shape. It has a single configuration for which the object's energy is minimal. In contrast, a plastic object can reach a minimal energy state in a new shape. This system applies an energy relaxation algorithm between applications of the 3D ChainMail algorithm and whenever processing time is available. Constraints similar to those used for deformation are used to determine if an element satisfies elastic constraints relative to its neighbors. If elastic constraints are not satisfied, the element's position is adjusted to reduce the energy of the object.

Collision Detection

Each time an element is moved, the system checks for a collision between the moved element and other objects in the system. If a collision occurs, the system is not permissible and the moved elements are returned to their original positions. The step size towards the desired position is reduced until an allowable system is found or a minimum step size is reached. In the example presented here, objects only collide with the bounding walls of the viewing window and hence, in this implementation, a simple check of the element's x and y values is used to detect collisions. This system has also been implemented with similar results for more complex environments using the collision detection algorithm of the above S. Gibson article.

Visualization

In the current system, a number of techniques based on OpenGL have been used to render the 2D and 3D objects for real-time visual feedback. In 2D, object elements were displayed as either points, connecting grid lines, or 4-sided shaped polygons defined by neighboring elements. In 3D, either all of the object elements or just the surface elements were displayed as points.

In one embodiment, the ability to fix elements in the object is used in this 2-dimensional bone model derived from cross sectional MRI of the knee where the soft cartilage attached to a bone model is deformed.

High quality volume rendering is slow because of each of the millions of volume elements can contribute to the final image. However, new algorithms and hardware implementations have begun to address the need for interactive volume rendering of regular volumes.

Figure 15:
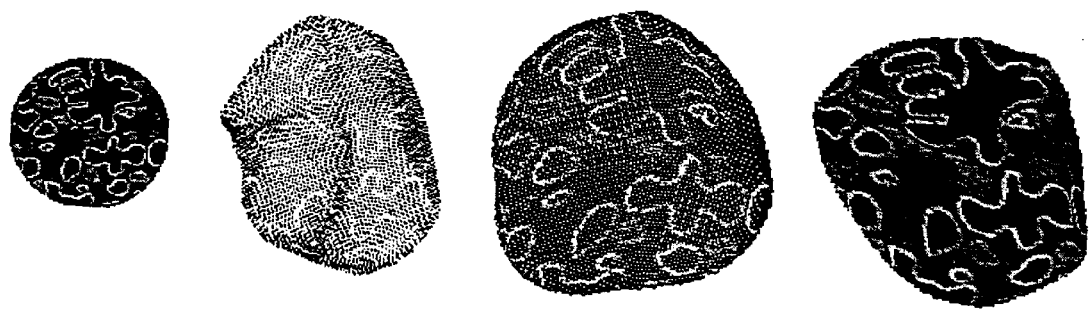
FIG. 15 is an illustration of the deformation of a 2D object, showing this original object, point rendering, grid rendering and shaded polygon rendering.
Figure 16:
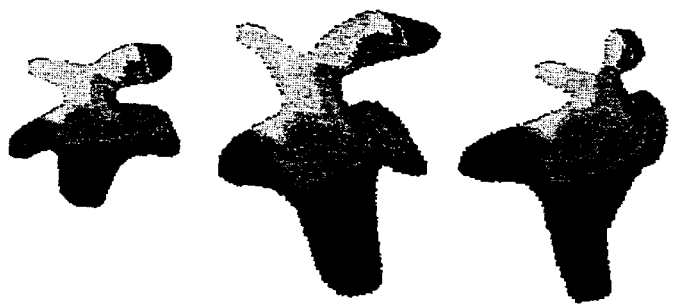
FIG. 16 is an illustration of the deformation of a non-convex 2D object.
Figure 17:
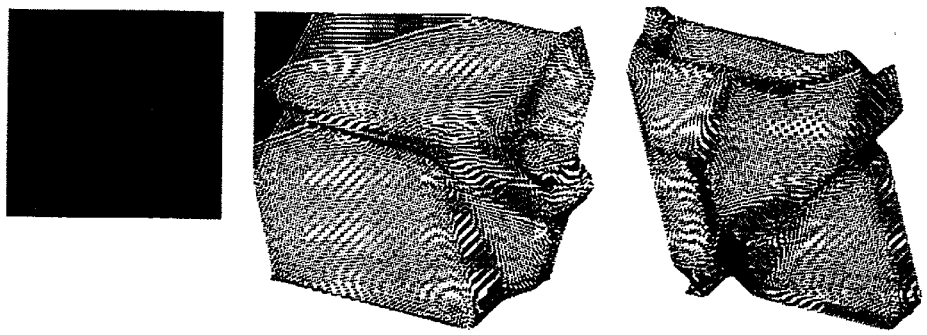
FIG. 17 is an illustration of the deformation of a 2D spare object.

FIGS. 15–17 show deformation of various 2D objects. We were able to achieve acceptable deformation rates for an object of size 180×180 elements. In addition, the system is able to deform non-convex objects and objects in which the position of some elements were fixed.

Figure 18:
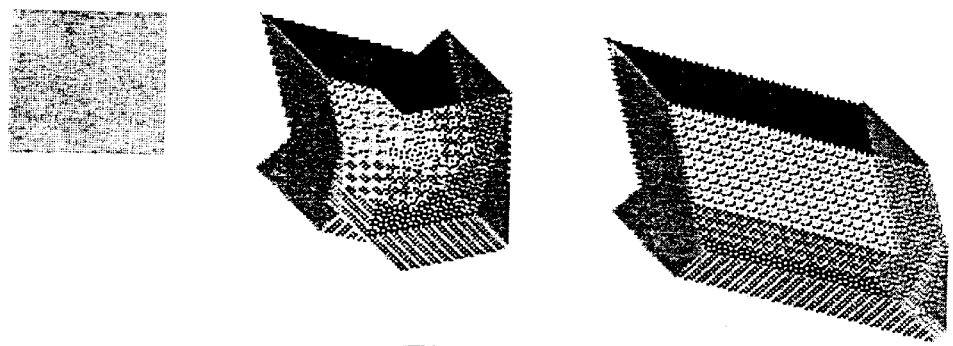
FIG. 18 is an illustration of the deformation of a 3D cube.

FIG. 18 shows the deformation of a 3D cube size of 50×50×50. When only surface points were rendered, frame rates of at least 3 per second were achieved on the SGI Indy that utilizes MIPS B5000 processors with XZ graphics.

Figure 19:
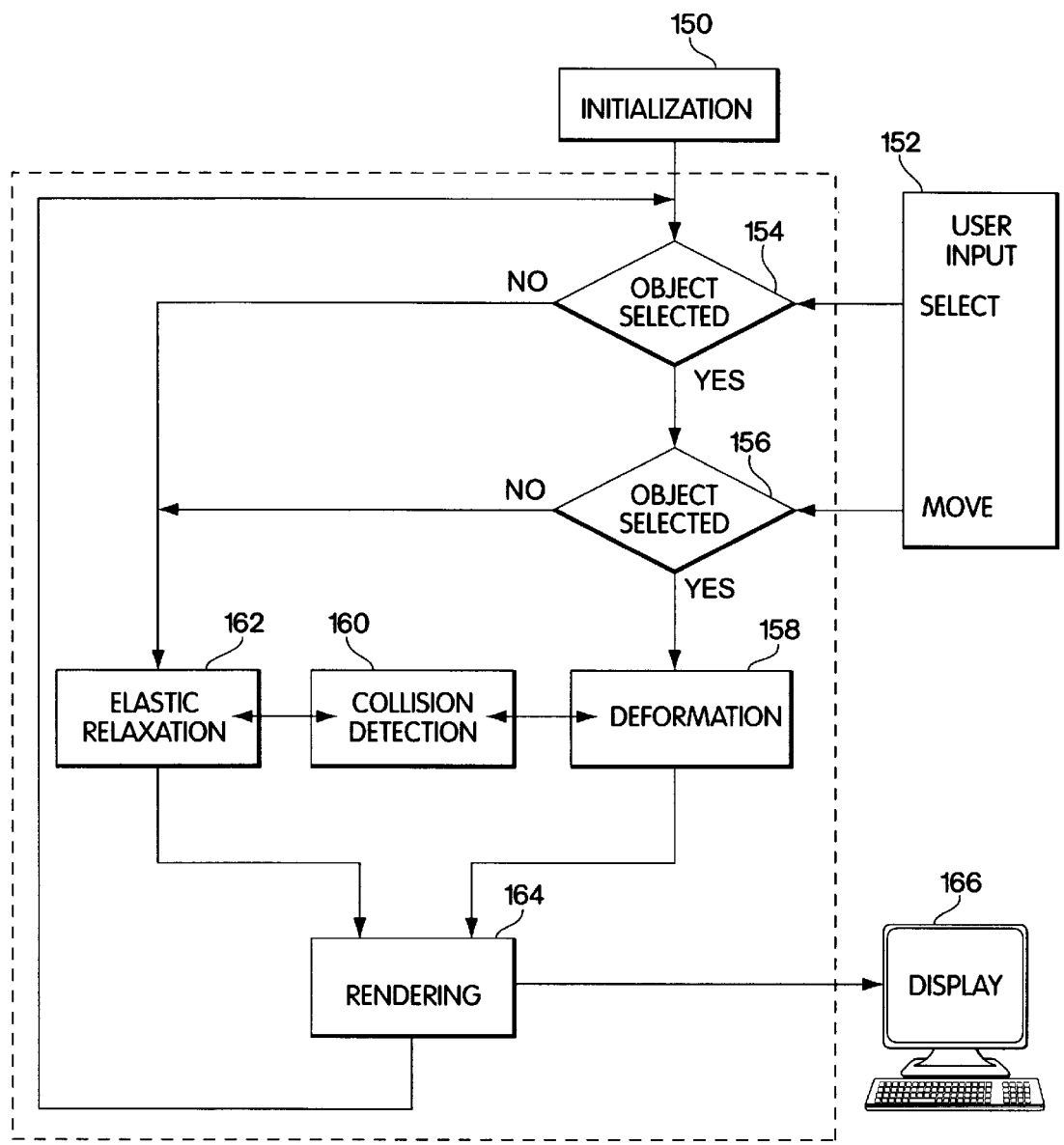
FIG. 19 is a block diagram of a system for deformation of a volumetric object utilizing the subject algorithm.

Referring now to FIG. 19, in one operative embodiment, an initialization step puts in the object by reading the object from a file. The program then enters a user input loop waiting for user input from 152. If a mouse button is pressed when the cursor is over the object, the point in the object under the cursor is selected at 154. If the mouse is subsequently moved as detected at 156, then the subject deformation algorithm at 158 is applied subject to collision detection at 160.

When no object is selected, the elastic relaxation algorithm described above is applied at 162 subject to collision detection, with the outputs of 158 and 162 resulting in a rerendering of the object at 164 which is coupled to display 161.

Collision detection may be accomplished by conventional techniques, whereas elastic relaxation refers to object movement, that once deformed, moves back towards the original configuration or shape. A program listing in C describing the operation of the subject system follows:

```
/* ............. ~gibson/onyx/I3DG_demo/deform2D/deform2D_object.c ..........
 *
 * This program reads in an object file that contains the following
 * information:
 *
 *                              (int)  x_size, y_size, x0, y0
 *         (Deform2DParameters) equilib, deform
 *              (Deform2DVertex) object[x_size] [ysize]
 *
 * Writen by S. Gibson, MERL Cambridge, Sept. 1996.
 */
/* includes */
#include <stdlib.h>
#include <math.h>
#include <stdio.h>
#include <time.h>
#include <strings.h>
#include <X11/Xlib.h>
#include <X11/X.h>
#include <X11/Xutil.h>
#include <X11/Xos.h>
#include <X11/Xatom.h>            /* for XA_RGB_DEFAULT_MAP atom */
#include <X11/Xmu/StdCmap.h>      /* for XmuLookupStandardColormap ( ) */
#include <X11/keysym.h>           /* for XK_Escape keysum */
#include <GL/glx.h>               /* this includes X and gl.h headers */
#include <GL/glu.h>               /* gluPerspective( ), gluLookAt( ), GLU polygon
                                   * tesselator */

/* global definitions */
#define WIDTH   800
#define HEIGHT  800
#define MINSTEP            0.2
#define NUMITERATIONS      2
#define MAXITERATIONS      50
#define MAXOBJHEIGHT       HEIGHT
#define MAXOBJSIZE         WIDTH*HEIGHT
#define POINTS 1
#define BIG_POINTS 2
#define GRID 3
#define POLYGON 4
#define EMPTY    -1                                            /* occupancy map constants */
#define FIXED    10
#define NONE      0                                            /* object types */
#define RIGID    99
```

-continued

```
#define HELD      100
#define TRUE      1
#define FALSE     0
#define byte unsigned char
#define PMODE 0644                              /* RW for owner, R for group, others */
/* structure definitions */
typedef Struct Deform2DVertex {
  byte type;                                    /* object id code or type */
  byte r, g, b;                                 /* volume element color */
  float x, y;                                   /* volume element position */
} Deform2DVertex;
typedef struct Deform2DChangedVertex {
  float oldX, oldY;                             /* previous voxel position */
  int index;                                    /* address of changed voxel */
} Deform2DChangedVertex;
typedef struct Deform2DParameters {
  float maxDx, minDx;                  /* movement constraints on left-right neighbors */
  float maxHorizDy;                            /* max shear of left_right neighbors */
  float maxDy, minDy;                  /* movement constraints on top-bottom neighbors */
  float maxVertDx;                             /* max shear of top-bottom neighbors */
} Deform2DParameters;
typedef struct Deform2DObject {
  int xSize, ySize;                             /* object array size */
  float x0, y0;                                 /* object position */
  Deform2DVertex *data;                         /* object voxel data */
} Deform2DObject;
/* gobal display variables */
int filedes;                                    /* file descriptor */
Window win;
Display *dpy;
Atom wmDeleteWindow;
GLboolean doubleBuffer = GL_TRUE, iconic = GL_FALSE, keepAspect = GL_FALSE;
int W = HEIGHT, H = HEIGHT;
XSizeHints sizeHints = (0);
GLdouble bodyWidth = 2.0;
int configuration [] = {GLX_DOUBLEBUFFER, GLX_RGBA, GLX_DEPTH_SIZE, 16, None};
/* global parameter variables */
Deform2DParameters equ;
Deform2DParameters deform;
int topOffset, bottomOffset, leftOffset, rightOffset;
/* function declarations */
/* in file display.c */
Colormap GetColormap (XVisualInfo * vi);
void InitializeDisplay( );
void RenderObject(Deform2DObject obj, int renderMode);
void RenderPoints(Deform2DObject, obj);
void RenderBigPoints(Deform2DObject obj);
void RenderGrid(Deform2DObject obj);
void RenderPolygons(deform2DObject obj);
/* in file equilize.c */
int EquilizeVoxelPositions(Deform2DVertex *obj, int xSize, int ySize,
                           int *occ_map);
/* in file move_obj.c */
int TestMove(int xSize, int ySize, int *occMap, Deform2DVertex *obj,
             int selectedVoxelIndex, float dx, float dy);
void Unchange(Deform2DVertex *obj, Deform2DChangedVertex *changed,
              int numChanged);
int CheckNewPosition(int *occMap, Deform2DVertex *obj, int index,
                     Deform2DChangedVertex *changed, int *numChanged,
                     float x, float y);
int AddToNeighborList(Deform2DVertex *obj, int index, int *list,
                      int *listIndex);
int MoveVertex(int *occMap, Deform2DVertex *obj, int index,
               Deform2DChangedVertex *changed, int *numChanged,
               float x, float y);
int NewVertexPosition(float *x, float *y, float x2, float y2,
                      float maxDx, float minDx, float maxDy, float minDy);
/* in file objects.c */
int InitObjFromFile(Deform2DObject *obj, char *name);
main (argc, argv)
     int argc;
     char **argv;
{
    int i, j;
    int index, occIndex, imgIndex;
    int xTemp, yTemp;
    int stop = FALSE;
    int equilibrium = FALSE;
    int vertex = FALSE;
```

```
int count;
int allowed;
int type;
int voxelIndex;
int selectedVoxelIndex;
int occMap[WIDTH*HEIGHT];                    /* map contains indices to object voxels */
int renderMode = POINTS;
int dummy;
int posX, posY;
unsigned int keysButtons;
float x0, y0;
float x, y;
float xStep, yStep;
FILE *fp;
Window window;
XEvent event, ahead;
Deform2DObject obj;
Deform2DVertex edge;
/* 1) get the input arguments */
if (argc != 4) {
   fprintf (stdout,
         "USAGE: deform2D_object obj_filename x0 y0 \n");
   exit(0);
}
sscanf(argv[2], "%f", &obj.x0);
sscanf(argv[3], "%f", &obj.y0);
/* initialize occupancy map */
for (index = 0; index < WIDTH*HEIGHT; index++)
   occMap[index] = EMPTY;
/* fix edges of the occupancy map */
for (i = 0; i < WIDTH; i++) {
   occMap[i] = FIXED;                                       /* bottom edge */
   occMap[i + WIDTH * (WIDTH-1)] = FIXED;                   /* top edge */
   occMap[WIDTH * i] = FIXED;                               /* left edge */
   occMap[WIDTH-1 + WIDTH * i] = FIXED;                     /* right edge */
}
/* init object from the given file */
if (InitObjFromFile(&obj, argv[1]) == FALSE) {
   fprintf (stderr, "exiting due to file I/O error \n");
   exit(-1);
}
/* offset the object positions */
index = 0;
for (j = 0; j < obj.ySize; j++)
   for (i = 0: i < obj.xSize; i++) {
      obj.data[index].x += obj.x0;
      obj.data[index].y += obj.y0;
      index++;
   }
/* add object to the occupancy map */
index = 0;
for (j = 0; j < obj.ySize; j++) {
   for (i = 0; i < obj.xSize; i++) {
     if (obj.data[index].type != NONE) {
        occIndex = (int) obj.data[index].x + WIDTH * ((int) obj.data[index].y);
        if (occMap[occIndex] != EMPTY) {
          fprintf (stderr,
                "error: trying to add object to occupied position\n");
          fprintf (stderr,
                "obj(%d,%d) at (%f,%f) at occIndex %d is filled with %d\n",
                i, j, obj.data[index].x, obj.data[index].y,
                occIndex, occMap[occIndex]);
          exit (-1);
        }
        occMap[occIndex] = index;
     }
     index++;
   }
}
/* open and initialize the XWindow for this application */
InitializeDisplay( );
/* draw the initial voxels */
RenderObject(obj, renderMode);
/* move voxels links until quit from interface */
while (stop == FALSE) {
    if (XEventsQueued (dpy, QueuedAfterReading) == 0) {
      XFlush (dpy);
      EquilizeVoxelPositions(obj.data. obj.xSize, obj.ySize, occMap);
      RenderObject(obj, renderMode);
```

-continued

```
    }
    else {
     XNextEvent(dpy, &event);
     switch (event.type) {
     case MotionNotify:
       /* compress MotionNotify events */
       while (XEventsQueued(dpy, QueuedAfterReading) > 0) {
        XPeekEvent(dpy, &ahead);
        if (ahead.type != MotionNotify) break;
        if (ahead.xmotion.window != event.xmotion.window) break;
        XNextEvent (dpy, &event);
       }
       /* move to new position */
       if (vertex != 0) {
        if ((selectedVoxelIndex != EMPTY) && (selectedVoxelIndex != FIXED) &&
            (obj.data[selectedVoxelIndex].type != RIGID)) {
         /* get new position */
         xTemp = event.xmotion.x;
         yTemp = event.xmotion.y;
         xStep = xTemp − x0;
         yStep = yTemp − y0;
         allowed = FALSE;
         while ((allowed == FALSE) &&
               ((fabs(xStep) > MINSTEP) || (fabs(yStep) > MINSTEP)) ) {
          allowed = TestMove(obj.xSize, obj.ySize, occMap, obj.data,
                             selectedVoxelIndex, xStep, yStep);
          xStep /= 2.0;
          yStep /= 2.0;
         }
         x0 = xTemp;
         y0 = yTemp;
         equilibrium = 0;
         count = 0;
         while ((equilibrium == 0) && (count < NUMITERATIONS)) {
          equilibrium =
            EqualizeVoxelPositions(obj.data, obj.xSize, obj.ySize, occMap);
          count ++;
         }
         RenderObject(obj, renderMode);
        }
       }
       break;
     case ButtonPress:
       x0 = x = event.xbutton.x;
       y0 = y = event.xbutton.y;
       /* look for vertex in neighbor of selected occupancy map cell */
       while ((vertex == 0) && (x < x0 + 5)) {
        while ((vertex == 0) && (y < y0 + 5)) {
         occIndex = (int) x + WIDTH * ((int) y);
         if (occMap[occIndex] != EMPTY) {
          selectedVoxelIndex = occMap[occIndex];
          vertex = 1;
         }
         y += 1.0;
        }
        y = y0;
        x += 1.0;
       }
       break;
     case ButtonRelease:
       if (vertex != 0) {
        fprintf (stderr, "release selected voxel at address %d \n",
                selectedVoxelIndex);
        selectedVoxelIndex = EMPTY;
       }
       vertex = 0;                                              /* release vertex */
       RenderObject(obj, renderMode);
       break;
     case KeyPress:
       if ((XLookupKeysym((XKeyEvent *) & event, 0) == XK_Escape)) {
         fprintf (stderr, "exit \n");
         exit(0);
       }
       if ((XLookupKeysym((XKeyEvent *) & event, 0) == XK_F1)) {
         fprintf (stderr, "F1: rigid object \n");
         deform.maxDx = 1.0;
         deform.minDx = 1.0;
         deform.maxHorizDy = 0.0;
         deform.maxDy = 1.0;
```

-continued

```
            deform.minDy = 1.0;
            deform.maxVertDx = 0.0;
        }
        if ((XLookupKeysym((XKeyEvent *) & event, 0) == XK_F2)) {
            fprintf (stderr, "F2: deformable object \n");
            deform.maxDx = 1.2;
            deform.minDx = 0.8;
            deform.maxHorizDy = 0.2;
            deform.maxDy = 1.2;
            deform.minDy = 0.8;
            deform.maxVertDx = 0.2;
        }
        if ((XLookupKeysym((XKeyEvent *) & event, 0) == XK_F3)) {
            fprintf (stderr, "F3: anisotropic object \n");
            deform.maxDx = 2.0;
            deform.minDx = 0.5;
            deform.maxHorizDy = 0.2;
            deform.maxDy = 1.0;
            deform.minDy = 1.0;
            deform.maxVertDx = 0.2;
        }
        if ((XLookUpKeysym((XKeyEvent *) & event, 0) == XK_F4)) {
            fprintf (stderr, "F4: very deformable object \n");
            deform.maxDx = 3.0;
            deform.minDx = 0.5;
            deform.maxHorizDy = 0.5;
            deform.maxDy = 3.0;
            deform.minDy = 0.5;
            deform.maxVertDx = 0.5;
        }
        if ((XLookupKeysym((XKeyEvent *) & event, 0) == XK_F5)) {
            fprintf (stderr, "F5: render points \n");
            renderMode = POINTS;
        }
        if ((XLookupKeysym((XKeyEvent *) & event, 0) == XK_F6)) {
            fprintf (stderr, "F6: render big points \n");
            renderMode = BIG_POINTS;
        }
        if ((XLookUpKeysym((XKeyEvent *) & event, 0) == XK_F7)) {
            fprintf (stderr, "F7: render grid \n");
            renderMode = GRID;
        }
        if ((XLookupKeysym((XKeyEvent *) & event, 0) == XK_F8)) {
            fprintf (stderr, "F8: render polygons \n");
            renderMode = POLYGON;
        }
        break;
        }
       }
     }
    return;
    }
/*
 * ----------------------------------------------------------------------
 * EquilizeVoxelPostions --
 *
 * This program shifts the vertices to equilize distances between them. The
 * constraints are that a selected vertex can not move and edges tend not to
 * move unless distances are too large.
 * ----------------------------------------------------------------------
 */
int
EquilizeVoxelPositions(Deform2DVertex *obj, int xSize, int ySize, int *occMap)
{
    int i, j;
    int index, occIndex;
    int equilibrium;
    int neighbors;
    float threshold = 0.1;
    float dif;
    float moveX;
    float moveY;
    float x, y;
    float maxDx, minDx, maxHorizDy;
    float maxDy, minDy, maxVertDx;
    maxDx = equ.maxDx;
    minDx = equ.minDx;
    maxHorizDy = equ.maxHorizDy;
    maxDy = equ.maxDy;
```

```
minDy = equ.minDy;
maxVertDx = equ.maxVertDx;
/* if no adjustment is required, the system is at equilibrium */
equilibrium = 1;
/* un-ordered adjustment of interior points */
for (index = 0; index < xSize * ySize; index++) {
 if ((obj[index].type != NONE) && (obj[index].type != HELD) &&
    (obj[index].type != RIGID)) {
  x = obj[index].x;
  y = obj[index].y;
  moveX = 0;
  moveY = 0;
  neighbors = 0;
  /* if any of the equilibrium constraints are not satisfied, adjust
     the voxel position */
  /* distance to left voxel neighbor */
  if (obj[index+leftOffset].type != NONE) {
    neighbors++;
    if ((dif = (x - obj[index+leftOffset].x)) > maxDx)
      moveX -= dif - maxDx;
    else if (dif < minDx)
     moveX -= dif - minDx;
    if ((dif = (y - obj[index+leftOffset].y)) > maxHorizDy)
      moveY -= dif - maxHorizDy;
    else if (dif < - maxHorizDy)
      moveY -= dif + maxHorizDy;
  }
  /* distance to right voxel neighbor */
  if (obj[index+rightOffset].type = NONE) {
    neighbors++;
    if ((dif = (obj[index+rightOffset].x - x)) > maxDx)
      moveX += dif - maxDx;
    else if (dif < minDx)
      moveX += dif - minDx;
    if ((dif = (obj[index+rightOffset].y - y)) > maxHorizDy)
      moveY += dif - maxHorizDy;
    else if (dif < - maxHorizDy
      moveY += dif + maxHorizDy;
  }
  /* distance to top voxel neighbor */
  if (obj[index+topOffset].type = NONE) {
    neighbors++;
    if ((dif = (obj[index+topOffset].y - y)) > maxDy)
      moveY += dif - maxDy;
    else if (dif < minDy)
      moveY += dif - minDy;;
    if ((dif = (obj[index+topOffset].x - x)) > maxVertDx)
      moveX += dif - maxVertDx;
    else if (dif < - maxVertDx)
      moveX += dif + maxVertDx;
  }
  /* distance to bottom voxel neighbor */
  if (obj[index+bottomOffset].type = NONE) {
    neigbbors++;
    if ((dif = (y - obj[index+bottomOffset].y)) > maxDy)
      moveY -= dif - maxDy;
    else if (dif < minDy)
      moveY -= dif - minDy;
    if ((dif = (x - obj[index+bottomOffset].x)) > maxVertDx)
      moveX -= dif - maxVertDx;
    else if (dif < - maxVertDx)
      moveX -= dif + maxVertDx;
  }
  if ((fabs(moveX) > threshold)     fabs(moveY) > threshold)) {
    equilibrium = 0;
    moveX /= neighbors;                                              /* average over 4 neighbors */
    moveY /= neighbors;
    x += moveX;
    y += moveY;
    /* only update if position is inside virtual space */
    if ((x >= 0) && (x < WIDTH) && y >= 0) && (y < HEIGHT)) {
      occIndex = (int) x + WIDTH *    (int) y);
      if (occMap[occIndex] != FIXED) {
       /* clear old occupancy map position */
       occMap[(int)] obj[index].x - WIDTH * (int) obj[index].y] = NULL;
       obj[index].x = x;
       obj[index].y = y;
       /* update occupancy map *
       occMap[occIndex] = index
```

```
            }
          }
         }
        }
       }
      }
   return(equilibrium);
}
/*
 * ------------------------------------------------------------------------------------
 *
 * TestMove --
 *
 * This program tests to see if the desired move is allowable. First the
 * selected voxels is moved to the desired position. Then neighbors are moved
 * to their minimum allowable positions relative to the moved voxels until
 * no more movement is required for an allowable system (return allowable = 1)
 * OR a voxel can not move into its allowable position (return allowable = 0)
 * because the occupancy map of the minimum allowable position is filled with
 * a fixed voxel.
 * ------------------------------------------------------------------------------------
 */
int
TestMove(int xSize, int ySize, int *occMap, Deform2DVertex *obj,
         int selectedVoxelIndex, float dx, float dy)
{
  int i;
  int occIndex;
  int nTop, nBottom, nLeft, nRight;
  int iTop, iBottom, iLeft, iRight;
  int numChanged = 0;
  int top[MAXOBJSIZE], bottom[MAXOBJSIZE];
  int left[MAXOBJSIZE], right[MAXOBJSIZE];
  float x, y;
  float x2, y2;
  float dif;
  float maxDx, minDx, maxHorizDy;
  float maxDy, minDy, maxVertDx;
  Deform2DChangedVertex changed[MAXOBJSIZE];
  maxDx = deform.maxDx;
  minDx = deform.minDx;
  maxHorizDy = deform.maxHorizDy;
  maxDy = deform.maxDy;
  minDy = deform.minDy;
  maxVertDx = deform.maxVertDx;
  iTop = iBottom = iLeft = iRight = 0;
  nTop = nBottom = nLeft = nRight = 0;
  /* move selected voxel to desired position */
  x = obj[selectedVoxelIndex].x + dx;
  y = obj[selectedVoxelIndex].y + dy;
  /* save old position and move to new position if it is allowable */
  if (MoveVertex(occMap, obj, selectedVoxelIndex, changed, &numChanged, x, y)
      == FALSE)
    return FALSE;
  /* add neighbors of the selected voxel to list for movement consideration */
  AddToNeighborList(obj, selectedVoxelIndex+topOffset, top, &nTop);
AddToNeighborList(obj, selectedVoxelIndex+bottomOffset, bottom, &nBottom);
AddToNeighborList(obj, selectedVoxelIndex+leftOffset, left, &nLeft);
AddToNeighborList(obj, selectedVoxelIndex+rightOffset, right, &nRight);
/* process lists of neighbor vertices to be considered for movement */
while ((iRight < nRight) || (iLeft < nLeft) || (iBottom < nBottom) ||
       (iTop < nTop)) {
  /* nRight = 0; */ /* for testing */
  while (iRight < nRight) {
    x = obj[right[iRight]].x;
    y = obj[right[iRight]].y;
    if (NewVertexPosition(&x, &y, obj[right[iRight]+leftOffset].x,
                          obj [right[iRight]+leftOffset].y,
                          maxDx, minDx, maxHorizDy, -maxHorizDy) == TRUE) {
      /* save old position and move to new position if it is allowable */
      if (MoveVertex(occMap, obj, right[iRight], changed, &numChanged, x, y)
          == FALSE)
        return FALSE;
      /* add neighbors to list for movement consideration */
      AddToNeighborList(obj, right[iRight]+rightOffset, right, &nRight);
      AddToNeighborList(obj, right[iRight]+topOffset, top, &nTop);
      AddToNeighborList(obj, right[iRight]+bottomOffset, bottom, &nBottom);
    }
    iRight++;
  }
```

```
/* consider left vertices of the selected neighbor */
/*   nLeft = 0; *//* for testing */
while (iLeft < nLeft) {
   x = obj[left[iLeft]].x;
   y = obj[left[iLeft]].y;
   if (NewVertexPosition(&x, &y, obj[left[iLeft]+rightOffset].x,
                              obj[left[iLeft]+rightOffset].y,
                              -minDx, -maxDx, maxHorizDy, -maxHorizDy) == TRUE) {
      /* save old position and move to new position if it is allowable */
      if (MoveVertex(occMap, obj, left[iLeft], changed, &numChanged, x, y)
            == FALSE)
         return FALSE;
      /* add neighbors to list for movement consideration */
      AddToNeighborList(obj, left[iLeft]+leftOffset, left, &nLeft);
      AddToNeighborList(obj, left[iLeft]+topOffset, top, &nTop);
      AddToNeighborList(obj, left[iLeft]+bottomOffset, bottom, &nBottom);
   }
   iLeft++;
}
/* consider top neighboring vertices of the selected neighbor */
/* NOTE: actally need to consider all top and bottom neighbors each time a
   new right and left neighbor is added so that left and right edges are
   handled correctly */
/* nTop = 0; *//* for testing */
while (iTop < nTop) {
   x = obj[top[iTop]].x;
   y = obj[top[iTop]].y;
   if (NewVertexPosition(&x, &y, obj[top[iTop]+bottomOffset].x,
                              obj[top[iTop]+bottomOffset].y,
                              maxVertDx, -maxVertDx, maxDy, minDy) == TRUE) {
         /* save old position and move to new position if it is allowable */
         if (MoveVertex(occMap, obj, top[iTop], changed, &numChanged, x, y)
               == FALSE)
            return FALSE;
         /* add neighbors to list for movement consideration */
         AddToNeighborList(obj, top[iTop]+topOffset, top, &nTop);
         if (obj[top[iTop]+bottomOffset+rightOffset].type == NONE)
            AddToNeighborList(obj, top[iTop]+rightOffset, right, &nRight);
         if (obj[top[iTop]+bottomOffset+leftOffset].type == NONE)
            AddToNeighborList(obj, top[iTop]+leftOffset, left, &nLeft);
      }
      iTop++;
   }
      /* consider bottom neighboring vertices of the selected neighbor */
      /* nBottom = 0; *//* for testing */
      while (iBottom < nBottom) {
         x = obj[bottom[iBottom]].x;
         y = obj[bottom[iBottom]].y;
         if (NewVertexPosition(&x, &y, obj[bottom[iBottom]+topOffset].x,
                                 obj [bottom[iBottom]+topOffset].y,
                                 maxVertDx, -maxVertDx, -minDy, -maxDy) == TRUE) {
            /* save old position and move to new position if it is allowable */
            if (MoveVertex(occMap, obj, bottom[iBottom], changed, &numChanged,
                        x, y)
                  == FALSE)
               return FALSE;
            /* add neighbors to list for movement consideration */
            AddToNeighborList(obj, bottom[iBottom]+bottomOffset, bottom, &nBottom);
            if (obj[bottom[iBottom]+topOffset+rightOffset].type == NONE)
               AddToNeighborList(obj, bottom[iBottom]+rightOffset, right, &nRight);
            if (obj[bottom[iBottom]+topOffset+leftOffset].type == NONE)
               AddToNeighborList(obj, bottom[iBottom]+leftOffset, left, &nLeft);
         }
         iBottom++;
      }
   }
   /* update occupancy map */
   for (i = 0; i < numChanged; i++) {
      occIndex = (int) changed[i].oldX + WIDTH * ((int) changed[i].oldY);
      /* only empty occMap cell if it contains this index */
      if (occMap[occIndex] == changed[i].index) {
         occMap[occIndex] = EMPTY;
      }
   }
   for (i = 0; i < numChanged; i++) {
      occIndex = (int) (obj[changed[i].index].x) +
         WIDTH * ((int) (obj[changed[i].index].y));
      /* update occMap even if cell occupied (coexisting voxel may move later) */
      occMap[occIndex) = changed[i].index;
```

```
      }
      return TRUE;
}
/*
 * --------------------------------------------------------------------------------
 * Unchanged --
 *
 * This procedure returns vertices that were moved to their original
 * positions.
 *
 * --------------------------------------------------------------------------------
 */
void
Unchange(Deform2DVertex *obj, Deform2DChangedVertex *changed, int numChanged)
{
    int i;
    for (i = 0; i < numChanged; i++) {
       obj[changed[i].index].x = changed[i].oldX;
       obj[changed[i].index].y = changed[i].oldY;
    }
}
/*
 * --------------------------------------------------------------------------------
 * InitObjFromFile --
 *
 * This procedure initializes an object model from the named file.
 *
 * --------------------------------------------------------------------------------
 */
int
InitObjFromFile(Deform2DObject *obj, char *name)
{
    int i, j, index;
    int spread = 1;
    int xSize, ySize;
    int fd, n;
    /* open file and read object header */
    fprintf (stderr, "open data file %s \n", name);
    if ((fd = open(name, O_RDONLY, 0)) == -1) {
       fprintf (stderr, "can't open file %s \n", name);
       return(FALSE);
    }
    if ((n = read(fd, &xSize, sizeof(int))) != sizeof(int)) {
      fprintf(stderr, "error reading xSize \n");
      return(FALSE);
    }
    if ((n = read(fd, &ySize, sizeof(int))) != sizeof(int)) {
      fprintf(stderr, "error reading ySize\n");
      return(FALSE);
    }
    fprintf (stderr, "object size = %dx%d \n", xSize, ySize);
    obj->xSize = xSize;
    obj->ySize = ySize;
    topOffset = xSize;
    bottomOffset = -xSize;
    leftOffset = -1;
    rightOffset = 1;
    /* allocate space for object data */
    if ((obj->data = (Deform2DVertex *)
         malloc(xSize * ySize * sizeof (Deform2DVertex))) == NULL) {
      fprintf(stderr, "couldn't allocate storage for object \n");
      exit(1);
    }
    /* read the equilibrium and deformation parameters */
    if ((n = read(fd, &equ, sizeof(Deform2DParameters))) !=
        sizeof(Deform2DParameters)) {
       fprintf(stderr, "error reading equilibrium parameters \n");
       exit(-1);
    }
    if ((n = read(fd, &deform, sizeof(Deform2DParameters))) !=
        sizeof(Deform2DParameters)) {
       fprintf(stderr, "error reading deformation parameters \n");
       exit(-1);
    }
    if ((n = read(fd, obj->data, xSize*ySize*sizeof(Deform2DVertex))) !=
        xSize*ySize*sizeof(Deform2DVertex)) {
       fprintf(stderr, "error reading data from file %s \n", name);
       return(FALSE);
    }
```

```
        close(fd);
        return (TRUE);
}
/*
 * ---------------------------------------------------------------------
 * GetTrueColorColorMap --
 *
 * This function gets a TrueColor colormap for the given visual.
 * ---------------------------------------------------------------------
 */
Colormap
GetTrueColorColorMap(XVisualInfo * vi)
{
    Status           status;
    XStandardColormap *standardCmaps;
    Colormap         cmap;
    int              i, numCmaps;
    if (vi->class != TrueColor) {
        fprintf (stderr, "fatalError: no support for non-TrueColor visual \n");
        exit(0);
    }
    status = XmuLookupStandardColormap(dpy, vi->screen, vi->visualid,
                                       vi->depth, XA_RGB_DEFAULT_MAP,
                                       /* replace */ False, /* retain */ True);
    if (status == 1) {
        status = XGetRGBColormaps(dpy, RootWindow(dpy, vi->screen),
                                  &standardCmaps, &numCmaps, XA_RGB_DEFAULT_MAP);
        if (status == 1)
          for (i = 0; i < numCmaps; i++)
            if (standardCmaps[i].visualid == vi->visualid) {
              cmap = standardCmaps[i].colormap;
              XFree(standardCmaps);
              return cmap;
            }
    }
    /* if there is no standard TrueColor colormap, make an unshared one */
    cmap = XCreateColormap(dpy, RootWindow(dpy, vi->screen),
                           vi->visual, AllocNone);
    return cmap;
}
/*
 * ---------------------------------------------------------------------
 * InitializeDisplay --
 *
 * This function initializes a GL window with a TrueColor colormap.
 * ---------------------------------------------------------------------
 */
void
InitializeDisplay( )
{
 XVisualInfo      *vi;
 Colormap         cmap;
XsetWindowAttributes swa;
 XWMHints         *wmHints;
 GLXContext       cx;
 XEvent           event;
 char             *display = NULL, *geometry = NULL;
 int              flags, x, y, i;
 /* open a connection to the X server */
 dpy = XOpenDisplay(display);
 if (dpy == NULL) {
   fprintf (stderr, "fatalError: could not open display \n");
   exit(0);
 }
 /* make sure OpenGL's GLX extension supported */
 if (!glXQueryExtension(dpy, NULL, NULL)) {
   fprintf (stderr, "fatalError: X server has no OpenGL GLX extension \n");
   exit(0);
 }
 /* find an appropriate visual and a colormap for it */
/* doubleBuffer = GL_FALSE;     */      /**** added for single buffering ***/
 if (!doubleBuffer) goto SingleBufferOverride;
 vi = glXChooseVisual(dpy, DefaultScreen(dpy), configuration);
 if (vi == NULL) {
 SingleBufferOverride:
   vi = glXChooseVisual(dpy, DefaultScreen(dpy), &configuration[1]);
   if (vi == NULL) {
     fprintf (stderr,
              "fatalError: no appropriate RGB visual with depth buffer \n");
```

-continued

```
    exit(0);
  }
  doubleBuffer = GL_FALSE;
}
cmap = GetTrueColorColorMap(vi);
/* create an OpenGL rendering context */
cx = glXCreateContext(dpy, vi, /* no sharing of display lists */ NULL,
                /* direct rendering if possible */ GL_TRUE);
if (cx == NULL) {
  fprintf (stderr, "fatalError: could not create rendering context \n");
  exit(0);
}
/* create an X window with selected visual and right properties */
swa.colormap = cmap;
swa.border_pixel = 0;
swa.event_mask = ExposureMask | StructureNotifyMask | KeyPressMask |
  MapNotify | ButtonMotionMask | ButtonPressMask | ButtonReleaseMask;
win = XCreateWindow(dpy, RootWindow(dpy, vi->screen),
                sizeHints.x, sizeHints.y, WIDTH, HEIGHT,
                0, vi->depth, InputOutput, vi->visual,
                CWBorderPixel | CWColormap | CWEventMask, &swa);
XSetStandardProperties(dpy, win, "knee cartilage", "2D demo",
                None, NULL, 0, &sizeHints);
wmHints = XAllocWMHints ( );
wmHints->initial_state = iconic ? IconicState : NormalState;
wmHints->flags = StateHint;
XsetWMHints(dpy, win, wmHints);
wmDeleteWindow = XInternAtom(dpy, "WM_DELETE_WINDOW", False);
XSetWMProtocols(dpy, win, &wmDeleteWindow, 1);
/* bind the rendering context to the window */
glXMakeCurrent(dpy, win, cx);
/* request the X window to be displayed on the screen */
fprintf (stderr, "map the window \n");
XMapWindow(dpy, win);
/* wait for the window to be mapped */
while (1) {
  XNextEvent(dpy, &event);
  if (event.type == MapNotify) break;
}
gluOrtho2D(0, WIDTH, HEIGHT, 0);
return;
}
/*
 * ----------------------------------------------------------------------------
 * RenderPoints --
 *
 * This procedure renders the object as a set of points using openGL
 * commands.
 * ----------------------------------------------------------------------------
 */
void
 RenderPoints(Deform2DObject obj)
{
 int i, j, index;
 glClear(GL_COLOR_BUFFER_BIT | GL_DEPTH_BUFFER_BIT);
 glPointSize(1.0);
 index = 0;
 glBegin(GL_POINTS);
 for (j = 0; j < obj.ySize-1; j++) {
  for (i = 0; i < obj.xSize-1; i++) {
   if (obj.data[index].type != NONE) {
    glColor3ub(obj.data[index].r, obj.data[index].g, obj.data[index].b);
    glVertex2f(obj.data[index].x, obj.data[index].y);
   }
   index++;
  }
 }
 glEnd( );
 if (doubleBuffer)
  glXSwapBuffers(dpy, win);                      /* buffer swap does implicit glFlush */
 else glFlush( );                                /* explicit flush for single buffered case */
 return;
}
/*
 * ----------------------------------------------------------------------------
 * RenderBigPoints --
 *
 * This procedure renders the object as a set of big points using openGL
 * commands.
```

-continued

```
 *  -----------------------------------------------------------------------------------------
 */
void
 RenderBigPoints(Deform2DObject obj)
{
 int i, j, index;
 glClear(GL_COLOR_BUFFER_BIT | GL_DEPTH_BUFFER_BIT);
 glPointSize(5.0);
 index = 0;
 glBegin(GL_POINTS);
 for (j = 0; j < obj.ySize-1; j++) {
  for (i = 0; i < obj.xSize-1; i++) {
   if (obj.data[index].type != NONE) {
    glColor3ub(obj.data[index].r, obj.data[index].g, obj.date[index].b);
    glVertex2f(obj.data[index].x, obj.data[index].y);
   }
   index++;
  }
 }
 glEnd( );
 if (doubleBuffer)
  glXSwapBuffers(dpy, win);                            /* buffer swap does implicit glFlush */
 else glFlush( );                                      /* explicit flush for single buffered case */
 return;
}
/*
 *  -----------------------------------------------------------------------------------------
 * RenderGrid --
 *
 * This procedure renders tbe object as a set of polygons using openGL
 * commands.
 *  -----------------------------------------------------------------------------------------
 */
void
 RenderGrid(Deform2DObject obj)
{
 int i, j, index;
 glClear(GL_COLOR_BUFFER_BIT | GL_DEPTH_BUFFER_BIT);
 index = 0;
 for (j = 0; j < obj.ySize; j++) {
  glBegin(GL_LINE_STRIP);
  for (i = 0; i < obj.xSize-1; i++) {
   if ((obj.data[index].type != NONE) &&
       (obj.data[index+rightOffset].type != NONE)) {
    glColor3ub(obj.data[index].r, obj.data[index].g, obj.data[index].b);
    glVertex2f(obj.data[index].x, obj.data[index].y);
    glColor3ub(obj.data[index+rightOffset].r,
               obj.data[index+rightOffset].g,
               obj.data[index+rightOffset].b);
    glVertex2f(obj.data[index+rightOffset].x,
               obj.data[index+rightOffset].y);
   }
   index++;
  }
  index++;
  glEnd ( );
 }
 for (i = 0; i < obj.ySize; i++) {
  glBegin(GL_LINE_STRIP);
  for (j = 0; j < obj.ySize-1; j++) {
   index = i + j*obj.xSize;
   if ((obj.data[index].type != NONE) &&
       (obj.data[index+topOffset].type != NONE)) {
    glColor3ub(obj.data[index].r, obj.data[index].g, obj.data[index].b);
    glVertex2f(obj.data[index].x, obj.data[index].y);
    glColor3ub(obj.data[index+topOffset].r,
               obj.data[index+topOffset].g,
               obj.data[index+topOffset].b);
    glVertex2f(obj.data[index+topOffset].x,
               obj.data[index+topOffset].y);
   }
  }
  glEnd( );
 }
 if (doubleBuffer)
  glXSwapBuffers(dpy, win);                            /* buffer swap does implicit glFlush */
 else glFlush( );                                      /* explicit flush for single buffered case */
 return;
}
```

```
/*
 * ----------------------------------------------------------------------------
 * RenderPolygons --
 *
 * This procedure renders the object as a set of polygons using openGL
 * commands.
 * ----------------------------------------------------------------------------
 */
void
RenderPolygons(Deform2DObject obj)
{
 int i, j, index;
 glClear(GL_COLOR_BUFFER_BIT | GL_DEPTH_BUFFER_BIT);
 index =0;
 for (j = 0; j < obj.ySize-1; j++) {
  for (i = 0; i < obj.xSize-1; i++) {
   if ((obj.data[index].type != NONE) &&
       (obj.data[index+rightOffset].type != NONE) &&
       (obj.data[index+rightOffset+topOffset].type != NONE) &&
       (obj.data[index+topOffset].type != NONE)) {
    glBegin(GL_POLYGON);
    glColor3ub(obj.data[index].r, obj.data[index].g, obj.data[index].b);
    glVertex2f(obj.data[index].x, obj.data[index].y);
    glColor3ub(obj.data[index+rightOffset].r,
               obj.data[index+rightOffset].g,
               obj.data[index+rightOffset].b);
    glVertex2f(obj.data[index+rightOffset].x,
               obj.data[index+rightOffset].y);
    glColor3ub(obj.data[index+rightOffset+topOffset].r,
               obj.data[index+rightOffset+topOffset].g,
               obj.data[index+rightOffset+topOffset].b);
    glVertex2f(obj.data[index+rightOffset+topOffset].x,
               obj.data[index+rightOffset+topOffset].y);
    glColor3ub(obj.data[index+topOffset].r,
               obj.data[index+topOffset].g,
               obj.data[index+topOffset].b);
    glVertex2f(obj.data[index+topOffset].x,
               obj.data[index+topOffset].y);
    glEnd( );
   }
   index++;
  }
  index++;
 }
 if (doubleBuffer)
  glXSwapBuffers(dpy, win);                    /* buffer swap does implicit glFlush */
 else glFlush( );                              /* explicit flush for single buffered case */
 return;
}
 /*
  * ----------------------------------------------------------------------------
  * AddToNeighborList --
  *
  * This procedure adds an index to the list of neighbors for movement
  * consideration.
  *
  * Note: do not check for valid indices -- assume all neighbors are in the
  * object because when created, the object is padded with empty voxels on
  * all edges and empty vertices are not considered for movement.
  *
  * ----------------------------------------------------------------------------
  */
 int
 AddToNeighborList(Deform2DVertex *obj, int index, int *list, int *listIndex)
 {
  if (obj[index].type != NONE) {
   list[*listIndex] = index;
   (*listIndex) ++;
   return TRUE;
  }
  return FALSE;
 }
 /*
  * ----------------------------------------------------------------------------
  * MoveVertex --
  *
  * This procedure checks to see if the indicated vertex is movable
  * and if the occupancy map cell at its destination position is
  * not occupied by a fixed object. If the position is allowable, the old
```

-continued

```
 * vertex position is stored in the list of changed vertices and then the
 * vertex position is updated.
 *
 * ------------------------------------------------------------------------------------
 */
int
MoveVertex(int *occMap, Deform2DVertex *obj, int index, Deform2DChangedVertex *changed,
           int = numChanged, float x, float y)
{
 int occIndex;
 /* check that position is in allowed virtual space */
 if ((x < 0) || (x >= WIDTH) || (y < 0) || (y >= HEIGHT) ||
     (obj[index].type == RIGID)) {
   /* fprintf (stderr, "desired movement out of virtual space \n"); */
   Unchange(obj, changed, *numChanged);
   return FALSE;
 }
 /* check to see if the desired position contains another object */
/* occIndex = (int) x + WIDTH * ((int) y);
 if (occMap[occIndex] != EMPTY) {
   if (occMap[occIndex] == FIXED) {
     Unchange(obj, changed, *numChanged);
     return FALSE;
   }
   if (obj[occMap[occIndex]].type == RIGID) {
     Unchange(obj, changed, *numChanged);
     return FALSE;
   }
 }
*/
 changed[*numChanged].index = index;
 changed[*numChanged].oldX = obj[index].x;
 changed[*numChanged].oldY = obj[index].y;
 (*numChanged) ++;
 obj[index].x = x;
 obj[index].y = y;
 return TRUE;
}
/*
 * ------------------------------------------------------------------------------------
 * NewVertexPosition --
 *
 * This procedure compares the positions of a vertex at (x,y) and its
 * neighbor at (x2,y2). If the relative x and y distances are outside of
 * the given ranges (minDx, maxDx) and (minDy, maxDy) respectively,
 * the position (x,y) is adjusted minimally to satisfy the constraints.
 *
 * ------------------------------------------------------------------------------------
 */
int
NewVertexPosition(float *x, float *y, float x2, float y2,
                  float maxDx, float minDx, float maxDy, float minDy)
{
 int moved = FALSE;
 float dif;
 if ((dif = *x - x2) > maxDx) {
   moved = TRUE;
   *x = x2 + maxDx;
 }
 else if (dif < minDx) {
   moved = TRUE;
   *x = x2 + minDx;
 }
 if ((dif = *y - y2) > maxDy) {
   moved = TRUE;
   *y = y2 + maxDy;
 }
 else if (dif < minDy) {
   moved = TRUE;
   *y = y2 + minDy;
 }
 return moved;
}
/*
 * ------------------------------------------------------------------------------------
 * RenderObject --
 *
 * This procedure calls the appropriate rendering engine depending on what
 * rendering mode is set.
```

-continued

```
 *
 * ------------------------------------------------------------------------------------------
 */
void
RenderObject(Deform2DObject obj, int renderMode)
{
  switch (renderMode) {
  case POINTS:
    RenderPoints(obj);
    break;
  case BIG_POINTS:
    RenderBigPoints(obj);
    break;
  case GRID:
    RenderGrid(obj);
    break;
  case POLYGON:
    RenderPolygons(obj);
    break;
  }
  return;
}
```

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for deforming a graphical object displayed amongst other graphical objects, comprising:

means including a computer for characterizing a graphical object as a volumetric object with volumetric elements;

a user interface coupled to said computer for selecting and moving a selected one of said volumetric elements;

means responsive to said user interface for deforming said graphical object by moving said selected volumetric element an amount specified by said user interface, the movement of said selected volumetric element resulting in the deformation of said graphical object;

means for detecting and preventing collisions between graphical objects during the deformation of said graphical object;

means coupled to the output of said graphical object deforming means for relaxing the relative positions of volumetric elements in the deformed graphical object based on the elasticity thereof; and, means coupled to the output of said relaxing means and including a display for rendering the result of moving, deforming and relaxing said volumetric graphical object.

2. The system of claim 1 wherein said graphical object deforming means includes means for moving a neighboring volumetric element for a distance and in a direction corresponding to the movement of said selected volumetric element.

3. The system of claim 2 wherein said neighboring volumetric element is moved only when a predetermined min/max distance threshold between said predetermined volumetric element and said neighboring volumetric element is exceeded and then only by that amount to which said threshold is exceeded.

4. The system of claim 3 wherein said threshold is set according to the rigidity that said graphical object is to represent.

5. The system of claim 3 wherein the movement of said neighboring element causes movement of a further neighboring volumetric element whenever said predetermined distance threshold is exceeded between said neighboring volumetric element and said further neighboring volumetric element.

6. The system of claim 1 wherein said deformed graphical object relaxing means includes means for adjusting the volumetric element positions within the deformed object.

7. A system for deforming a graphical object, comprising:

means including a computer for characterizing a graphical object as a volumetric object with volumetric elements;

a user interface coupled to said computer for selecting and moving a selected one of said volumetric elements, with said selected element being surrounded by neighboring volumetric elements;

means responsive to said user interface for deforming said graphical object by moving said selected volumetric element an amount specified by said user interface, the movement of said selected volumetric element resulting in movement of one or more of said neighboring volumetric elements, thus to cause the deformation of said graphical object; and, means coupled to the output of said deforming means and including a display for rendering the result of deforming said graphical object.

8. The system of claim 7 wherein said graphical object deforming means includes means for moving a neighboring volumetric element for a distance and in a direction corresponding to the movement of said selected volumetric element.

9. The system of claim 8 wherein said neighboring volumetric element is moved only when a predetermined min/max distance threshold between said predetermined volumetric element and said neighboring volumetric element is exceeded and then only by that amount to which said threshold is exceeded.

10. The system of claim 9 wherein said threshold is set according to the rigidity that said graphical object is to represent.

11. The system of claim 7 wherein the movement of said neighboring element causes movement of a further neighboring volumetric element whenever said predetermined distance threshold is exceeded between said neighboring volumetric element and said further neighboring volumetric element.

12. A system for deforming a graphical object, comprising:
   means including a computer for characterizing a graphical object as a volumetric object with volumetric elements;
   a user interface coupled to said computer for selecting and moving a selected one of said volumetric elements, with said selected element being surrounded by neighboring volumetric elements;
   means responsive to said user interface for deforming said graphical object by moving said selected volumetric element an amount specified by said user interface, the movement of said selected volumetric element resulting in movement of one or more of said neighboring volumetric elements, thus to cause the deformation of said graphical object;
   means coupled to the output of said graphical object deforming means for relaxing the deformed graphical object based on the elasticity thereof; and,
   means coupled to the output of said relaxing means and including a display for rendering the result of relaxing said deformed graphical object.

13. A method for rapidly deforming a graphical object characterized as a volumetric object with volumetric elements
   selecting a volumetric element to be moved;
   moving said selected element;
   calculating the distances between said selected element and an ordered sequence of neighboring elements after said selected element's moved;
   comparing said distances with predetermined min/max thresholds; and,
   moving an element which is a neighbor of said selected element in the direction of movement of said selected element only if said min/max threshold is exceeded and only by that amount that said min/max threshold is exceeded, whereby the rapidity of propogation of the resultant deformation throughout the volume derives from the fact that each element in the volume is considered at most once for each deformation, is compared to only one neighbor to determine if and how it must be moved, and due to the fact that the deformation is propogated outwards from said selected element and terminates as soon as possible due to the min/max threshold constraints.

14. The method of claim 13 wherein said calculating step includes maintaining a list of pointers to elements that have been moved and their previous positions, maintaining lists of neighboring elements for movement, classified as to whether they are a top, left, bottom, or right neighbor of said selected element; processing each element in turn starting from said selected element and proceeding in order through right, left, top, and bottom lists of elements, with deformation min/max thresholds checked against said selected element; and wherein said moving step includes moving a checked element only if said min/max threshold is exceeded, with the movement stopped when said min/max threshold is satisfied.

15. A method for deforming a graphical object represented by graphical elements stored as a data structure in a memory of a computer system, each graphical element having associated values characterizing the graphical object at a specific location of the graphical object, comprising the steps of:
   assigning a minimum and maximum distance threshold to each graphical element;
   selecting a graphical element at a location;
   first moving the selected graphical element a distance in a selected direction from the location;
   in response to the first moving, second moving a neighboring graphical element located in the direction from the selected graphic element if the distance moved is less than the minimum or greater than the maximum distance threshold of the adjacent graphic element; and
   repeating the second moving for a next neighboring graphical element in the direction until the distance is greater than the minimum or less than the maximum distance threshold of the corresponding next neighboring graphic element.

16. The method of claim 15 wherein the graphical object has three dimensions, each graphical element is a voxel, and wherein neighboring graphical elements are to the left and right, the top and bottom, and the front and back of the selected graphical element.

* * * * *